United States Patent
Lundy et al.

(10) Patent No.: US 8,473,843 B2
(45) Date of Patent: Jun. 25, 2013

(54) CORRECTING DATA INPUTTED INTO A MOBILE COMMUNICATIONS DEVICE

(75) Inventors: Michael T. Lundy, Olathe, KS (US); Mathew Jay Van Orden, Leawood, KS (US); Brandon Christopher Annan, Westwood Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1260 days.

(21) Appl. No.: 12/058,400

(22) Filed: Mar. 28, 2008

(65) Prior Publication Data
US 2009/0249232 A1 Oct. 1, 2009

Related U.S. Application Data

(60) Provisional application No. 61/040,149, filed on Mar. 28, 2008.

(51) Int. Cl.
*G06F 3/048* (2006.01)
(52) U.S. Cl.
USPC .......................................... 715/257; 715/764

(58) Field of Classification Search
USPC ................................................. 715/764, 257
See application file for complete search history.

(56) References Cited

U.S. PATENT DOCUMENTS

| | | | | |
|---|---|---|---|---|
| 2002/0143828 A1* | 10/2002 | Montero et al. | ............... | 707/533 |
| 2005/0283726 A1* | 12/2005 | Lunati | ............ | 715/533 |
| 2008/0244387 A1* | 10/2008 | Fux et al. | ...................... | 715/257 |
| 2009/0077464 A1* | 3/2009 | Goldsmith et al. | ........... | 715/257 |
| 2009/0089666 A1* | 4/2009 | White et al. | ................... | 715/257 |
| 2009/0172523 A1* | 7/2009 | Colby | ........................... | 715/257 |

\* cited by examiner

*Primary Examiner* — Andrea Leggett

(57) ABSTRACT

A method, system, and medium are provided for inputting data into a mobile communications device having a touchscreen. An illustrative method includes receiving a user-entered character string and automatically replacing the user-entered character string with a suggested character string. The suggested character string is marked with a visual indication of the replacement and the visual indication is maintained even if the suggested character string is a correctly spelled word. An input region associated with the visual indication is provided such that a set of alternative character strings as suggested replacements may be provided incident to receiving touch input to the input region.

18 Claims, 31 Drawing Sheets

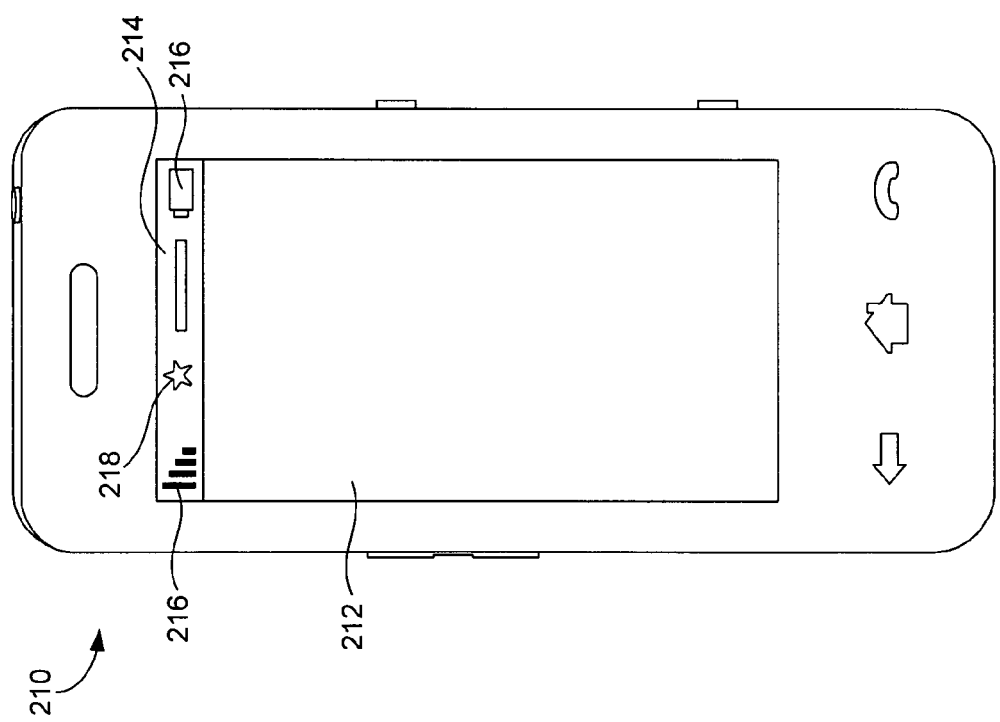

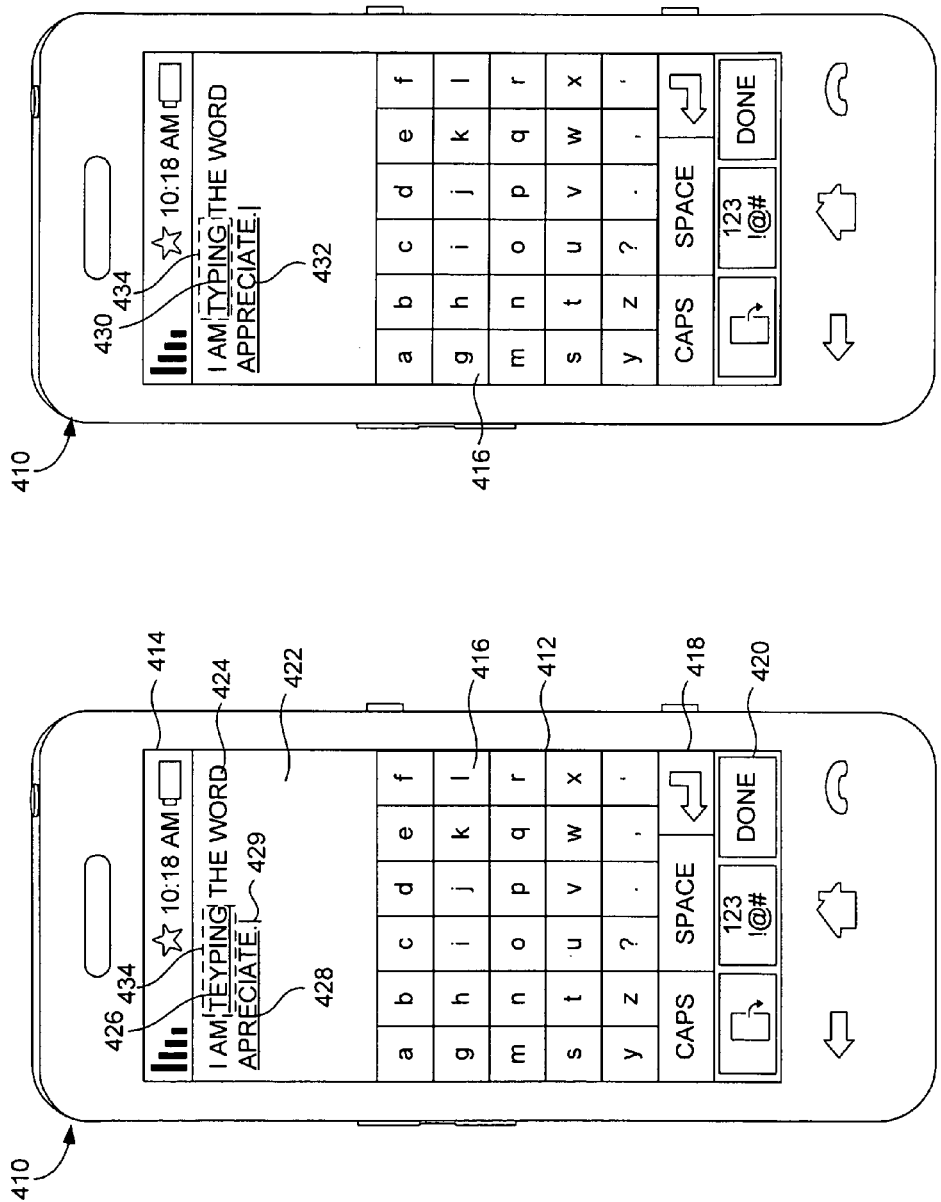

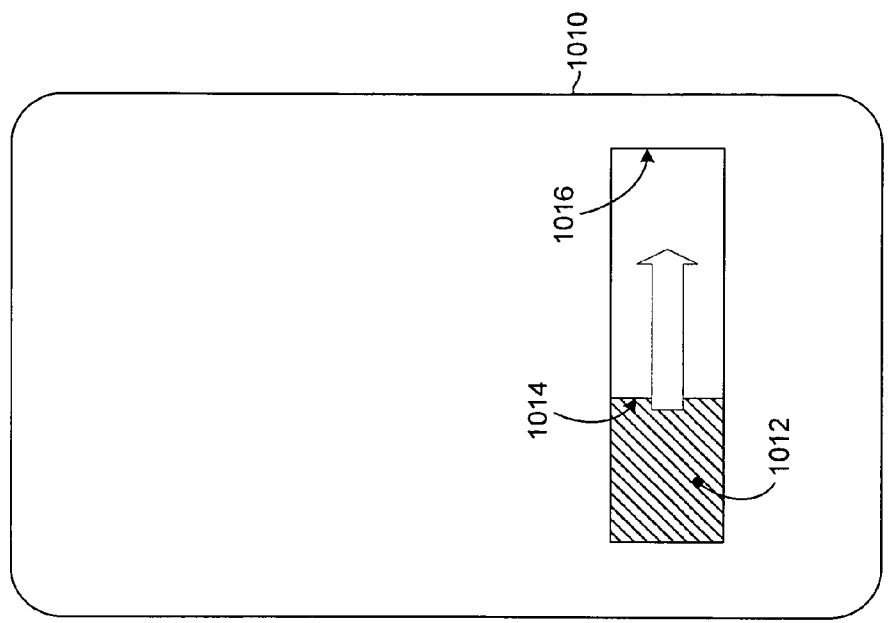
FIG. 10. – PRIOR ART

CORRECTING DATA INPUTTED INTO A MOBILE COMMUNICATIONS DEVICE

CROSS-REFERENCE TO RELATED APPLICATIONS

This application claims the benefit of, and expressly incorporates by reference, U.S. Provisional Application No. 61/040,149, filed on Mar. 28, 2008.

The following five applications are related by subject matter, one of which is instant application, and the other four are hereby expressly incorporated by reference herein: 1) "EVENT DISPOSITION CONTROL FOR MOBILE COMMUNICATIONS DEVICE" having Ser. No. 12/058,445; 2) "PERSISTENT EVENT-MANAGEMENT ACCESS IN A MOBILE COMMUNICATIONS DEVICE" having Ser. No. 12/058,383; 3) "LIST-POSITION LOCATOR" having Ser. No. 12/058,392; 4) "CORRECTING DATA INPUTTED INTO A MOBILE COMMUNICATIONS DEVICE" having Ser. No. 12/058,400; 5) "PHYSICAL FEEDBACK TO INDICATE OBJECT DIRECTIONAL SLIDE" having 12/058,390.

SUMMARY

The present invention is defined by the claims below, not this summary. We offer a high-level overview of embodiments of the invention here for that reason, to provide an overview of the disclosure.

In a first illustrative aspect, a method of inputting data into a mobile communications device is provided. One embodiment of the method includes receiving a user-entered character string and automatically replacing the user-entered character string with a suggested character string. The suggested character string is marked with a visual indication of the replacement and the marking is maintained even if the suggested character string is a correctly spelled word. The method also embodies providing an input region associated with the visual indication such that touch input thereto causes a set of alternative suggested character strings to be presented.

In a second illustrative aspect, a method of inputting data into a mobile communications device is provided. One embodiment of the method includes presenting an option permitting a user to select an active or inactive state associated with an automatic-correction function such that if the active state is selected, a user-entered character string is automatically replaced with a suggested character string that is determined by referencing a dictionary database. The method further includes marking the suggested character string with a visual indication that is maintained until an instruction to remove the visual indication is received.

In a final illustrative aspect, a method of inputting data into a mobile communications device is provided. The method includes receiving a user-entered character string and referencing a dictionary database having recognized character strings. The user-entered character string is replaced with a suggested characters string from the dictionary database and the suggested character string is marked with a visual indication of the replacement. The method also embodies presenting an option for removing the suggested character string from the dictionary database.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 2C depicts a persistently visible predetermined region on a display of an exemplary mobile communications device in accordance with embodiments of the present invention;

FIGS. 4A and 4B depict a modal keypad and examples of character strings marked with visual indications on a display of a mobile communications device in accordance with embodiments of the present invention;

FIG. 10 depicts a prior art technology;

DETAILED DESCRIPTION

Throughout the description of the present invention, several acronyms and shorthand notations are used to aid the understanding of certain concepts pertaining to the associated system and services. These acronyms and shorthand notations are intended for the purpose of providing an easy methodology of communicating the ideas expressed herein and are not meant to limit the scope of the present invention.

Further, various technical terms are used throughout this description. An illustrative resource that fleshes out various aspects of these terms can be found in *Newton's Telecom Dictionary* by H. Newton, 24$^{th}$ Edition (2008).

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
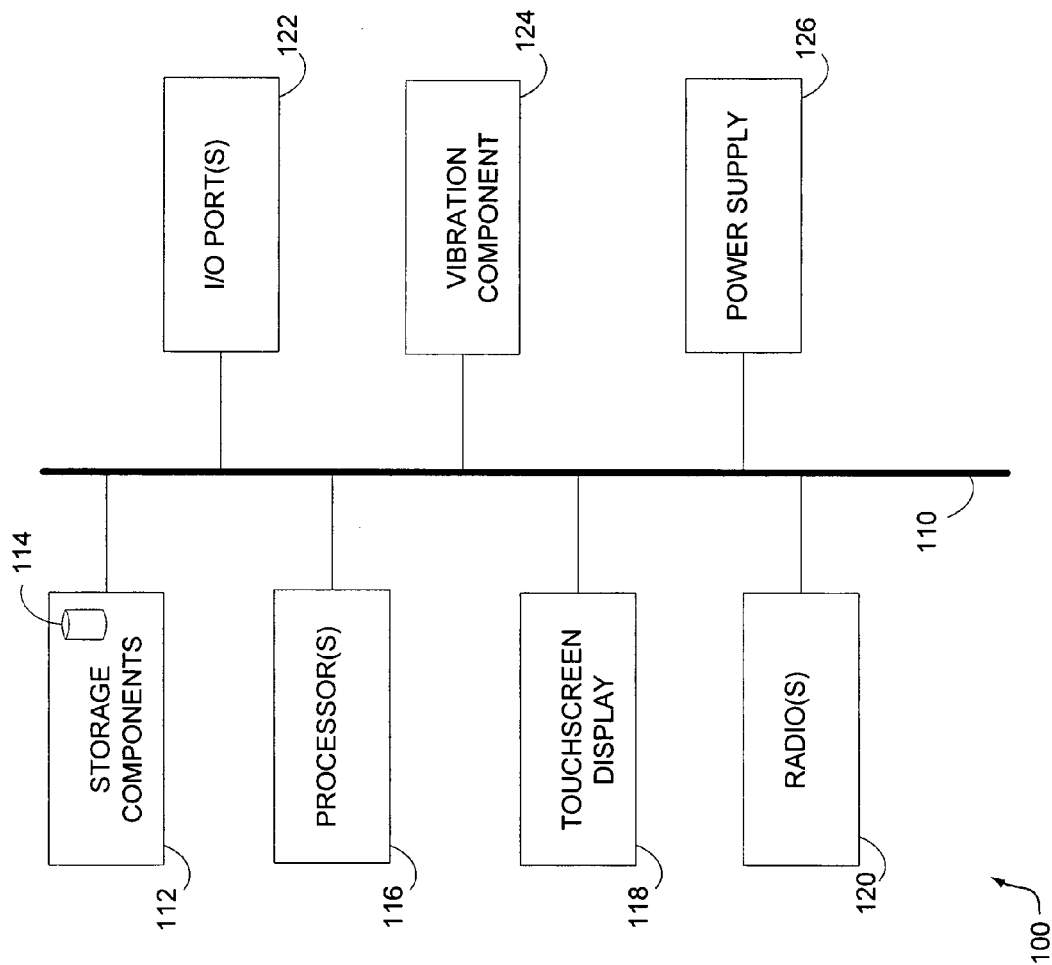
FIG. 1 is a block diagram of an exemplary mobile communications device that is suitable for operation of an embodiment of the present invention.
Figure 2B:
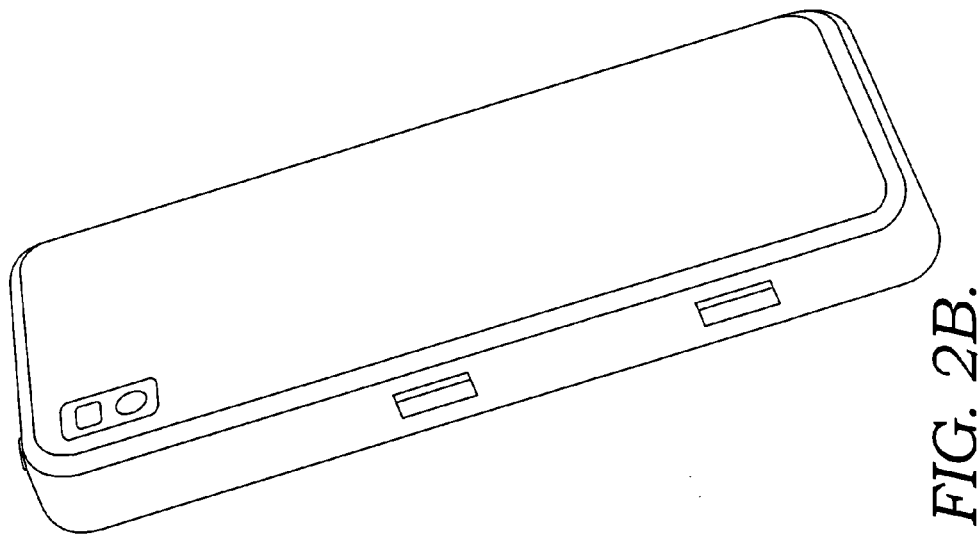
FIGS. 2A and 2B provide an overview of an illustrative mobile communications device suitable for practicing embodiments of the present invention.
Figure 2A:
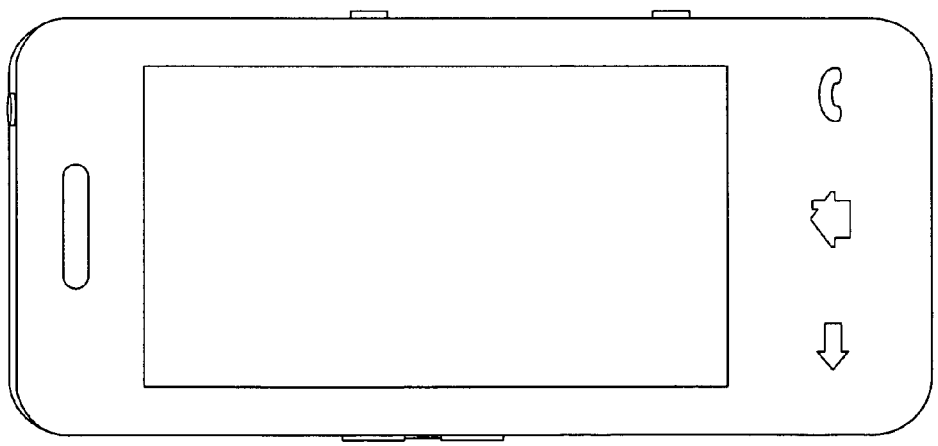

FIG. 1 depicts an illustrative block diagram of a mobile communications device that is suitable for operation of an embodiment of the present invention. Throughout this disclosure, reference will be made to a mobile communications device, such as in FIG. 2A and beyond. FIG. 1 depicts a selection of components that will generally be included in the mobile communications device to help facilitate various functional aspects of embodiments of the invention. As shown, a bus 110 couples, directly or indirectly, the following illustrative components: a storage component 112, a processor 116, a touchscreen display 118, a radio 120, input/output ports 122, a vibrating component 124 and a power supply 126.

Storage components 112 may take the form of the aforementioned computer-readable media. As with all of the illustrative components of FIG. 1, although we refer to them sometimes in the singular, that should not be read so as to imply that we mean only a single of each of the components is contemplated within the scope of our invention. To the contrary, by way of example, storage component or components 112 may actually be composed of constituent storage components located within mobile device 100. A portion or separate storage component includes database 114. In one embodiment, as will be explained in greater detail below, database 114 can be used to store a library of words or terms that can be referenced in connection with facilitating text entry by way of a keyboard presented on touchscreen display 118.

Processors 116 facilitate a flow of information among all or a portion of the components shown in FIG. 1 as well as computer-usable instructions that help facilitate various aspects of the present invention. For example, in one embodiment, an operating system of mobile device 100 also helps coordinate various functional aspects of the present invention. Processors 116 operate in connection with running such an operating system.

Touchscreen display 118 provides one avenue of inputting data into device 100. In one embodiment, touchscreen display 118 takes the form of a resistive touch screen, but in some embodiments, it might be capacitive. Touchscreen display 118 receives input by way of touch actions that cause a device to come in contact with touchscreen display 118. An illustrative example includes a user utilizing his or her finger to tap or use some other form of touch action to interact with mobile device 100. Other items such as a stylus, fingernail, etc. may be used to provide input to mobile device 100 by way of touchscreen display 118. Other illustrative touch actions include a sliding motion as well as multipoint touches.

Radios 120 facilitate the communication of wireless communication signals to and from mobile device 100. Illustrative protocols that can be utilized in connection with an embodiment of the present invention include CVMA, TVMA, GSM, GPRS, EVVO, etc. The radios facilitate wireless communications between the device and a national or even global telecommunications network.

Input/output ports 122 provide a way for mobile device 100 to interact with other peripheral components. Illustrative input/output ports include an ear-piece or headphone jack, a USB port, an infrared port, and the like. Different input/output ports could be provided as is needed to facilitate communication of other peripheral components.

Vibrating component 124 enables mobile device 100 to experience a vibrating action incident to an occurrence of different events. Vibrating component 124 may take on a variety of forms, such as a motor that operates with an offset mass. In one embodiment, vibrating component 124 takes the form of a haptics motor. Vibrating component 124 includes the ability to operate at various frequencies, which can be controlled by way of different software or hardware mechanisms of mobile device 100. That is, instead of mere playback of a vibrating action, vibrating component 124 can respond in real time to a varying stimulus.

Power supply 126 may also take on a variety of forms ranging from a battery to a charging mechanism to other forms of power sources that serve to provide power to mobile device 100.

The selected components of mobile device 100 are meant to be illustrative in nature, and the various lower-level details of the components are not elaborated on so as to not obscure the present invention. Clearly, some of the components may be absent in some embodiments of the present invention, and additional components not shown may also be part of mobile device 100. Attempting to show all of the various components of mobile device 100 would obscure certain novel aspects, and we will refrain from such elaboration at least for the sake of brevity.

Persistent Event-Management Access in a Mobile Communications Device

An aspect of an embodiment of the present invention includes an ability to view notification of new events with minimal effort by way of a mobile communications device. In one embodiment, a way to provide notification of new events (such as receiving a voicemail, instant message, etc.) is to provide a dynamically updateable list of items that indicates a change in status of an event, wherein the list is viewable by touching a predetermined region on a touchscreen device that is part of the mobile communications device.

Turning now to FIG. 2C, another representation of a mobile communications device is provided and referenced generally by the numeral 210. We use a separate reference numeral to help map the instant text to a relevant figure, but we do not mean to convey that mobile device 210 is different than any of the other many references to a mobile device throughout this disclosure, including the block-diagram representation of FIG. 1. Mobile device 210 includes a display 212, which in one embodiment is a touchscreen display that is able to receive input by way of touch actions or interactions. Touchscreen display 212 may be adapted to receive any number of types of touch actions such as single touches, taps, slides, or other gestures. Additionally, in various embodiments, touchscreen display 212 may be adapted to receive multiple simultaneous touch actions that may generate a type of input distinct from input generated by a single touch action.

Touchscreen display 212 also includes a predetermined region 214 that includes one or more dynamic icons 216 which indicate a state associated with the mobile communications device 210. As used herein, a state associated with the mobile communications device 210 may include any configuration of settings, features, event notifications, etc. associated with the functionality of the device 210. For example, in one embodiment, dynamic icons 216 may indicate that, as part of the state of the device 210, the battery power is at 100%, the radio signal is at a certain strength, the time of day, or any number of other state variables known in the art. We do not mean to limit the nature of the dynamic icons displayed in the predetermined region 214 herein, and it will be appreciated by those skilled in the art that any number of icons can be included to provide information of any kind.

In some embodiments, the predetermined region may be provided without including icons, and in other embodiments, the predetermined region may be provided in any area of the touchscreen display 212. For clarity and consistency, we illustrate predetermined region 214 as being provided at the top of touchscreen display 212 but do not mean to limit the arrangement to that illustrated herein. In an embodiment of the present invention, predetermined region 214 may be persistently presented. That is, regardless of what is being displayed on the touchscreen display 212, the predetermined region 214 is always displayed. Additionally, regardless of any type of application that is running, or any other type of functionality that is being presented on display 212, the predetermined region 214 may be visible. In various embodiments, predetermined region 214 is persistently visible, even when transitioning between a first and second screen displayed on the touchscreen display 212. It should be evident that the functionality associated with the display of predetermined region 214 is generally independent of many other aspects of the mobile communications device 210.

In further embodiments, exceptions may be made for the persistent display of predetermined region 214 such as, for example, when an application is being utilized that requires all of the screen real estate of display 212. Such an application may correspond to a text input mode presented in landscape orientation or portrait orientation, an audio/video presentation, and the like. Various modifications of such an exception may be made, including having no exception, and any one or combination of such configurations is intended to be within the ambit of the present invention.

Predetermined region 214 may also include a dynamic icon 218 that indicates whether a new event has occurred. As used herein, a new event may include things such as receiving a phone call, message (e.g., a voicemail, an email, a text message, and the like), initiating an alarm, receiving a file (e.g., a picture, an audio file, a video file, and the like), or arriving at a time associated with a calendared event, which may be an event that, upon occurrence, triggers an alarm, notification, or reminder to be presented. In one embodiment, dynamic icon 218 may be a particular image corresponding to a particular event. For example, dynamic icon 218 may appear as a phone handset when a new call is received.

In another embodiment, as shown in FIG. 2C, dynamic icon 218 may be represented as a generic image that indicates that a new event of any kind has occurred. That is, dynamic icon 218 may not be specific to any particular type of event, but rather may provide an indication that some event, whatever it is, has occurred. It will be appreciated that dynamic icon 218 can be represented with any type of image. For simplicity and clarity, dynamic icon 218 is represented in FIG. 2C and subsequent figures as a star. We do not mean, by this representation, to suggest that dynamic icon 218 must, or even should, be represented by a star, as any type of image or symbol may be equally as useful. A star is used herein as an arbitrary choice that provides clarity and consistency between the various figures.

In an embodiment of the present invention, predetermined region 214 is capable of receiving touch input. It will be appreciated by those skilled in the art that touchscreen display 212 may include numerous areas or regions (including the entire touchscreen display 212) that are capable of receiving touch input, and that the functionality provided by touch input at a particular location of touchscreen display 212 may vary, depending on particular applications, underlying operating systems, and the like. In an embodiment, predetermined region 214 may be configured in such a way that touch input to the predetermined region 214 always produces the same type of functionality. For example, as described further below, touch input to predetermined region 214 may always result in the presentation of a list of items.

Figure 2D:
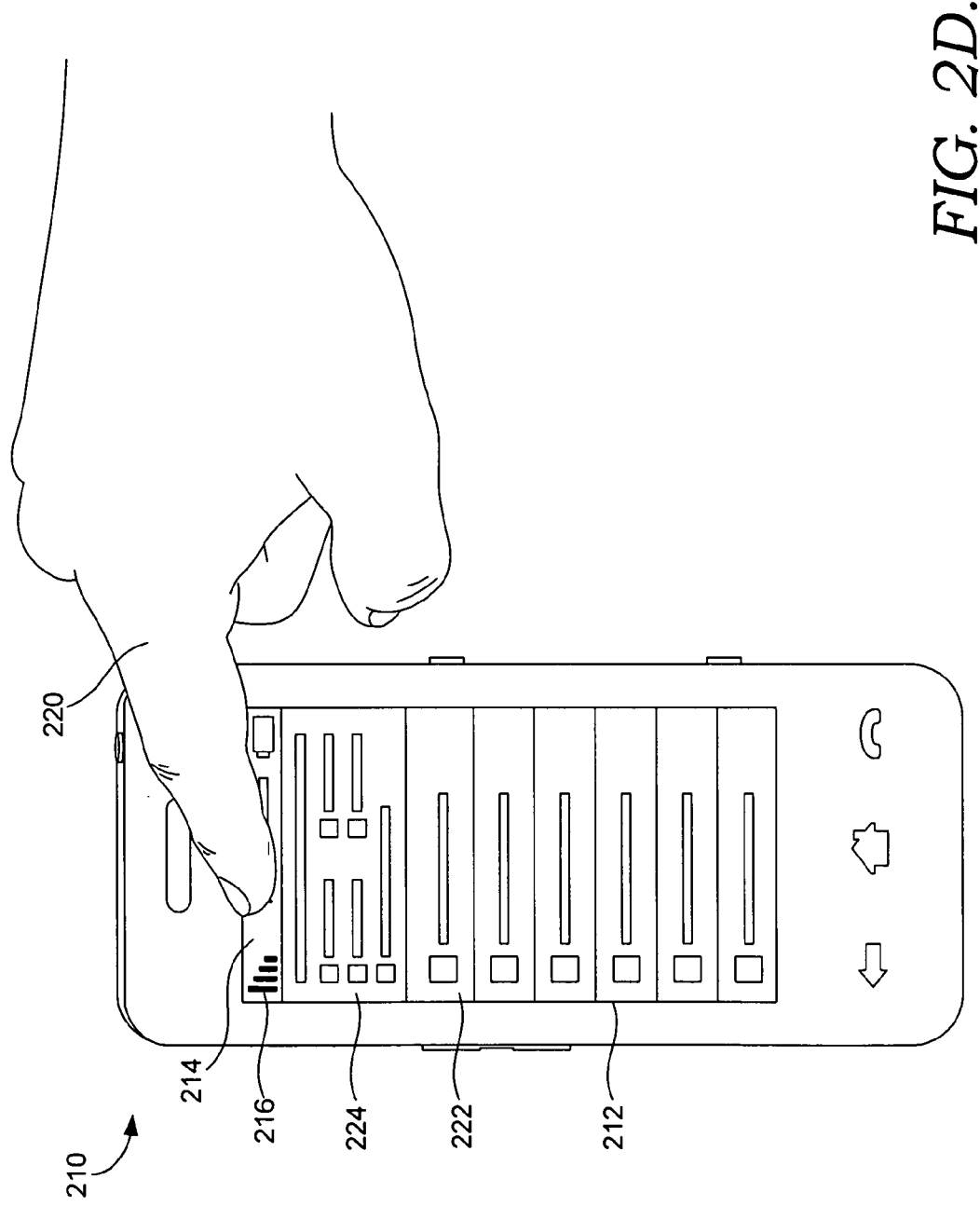
FIG. 2D depicts an illustration of a functional aspect associated with a touch input to a predetermined region on a display of a mobile communications device in accordance with embodiments of the present invention.

Turning now to FIG. 2D, a mobile communications device 210 is shown which includes predetermined region 214 capable of receiving touch input. A user's finger 220 is shown making contact with the touchscreen display 212 in the predetermined region 214. As described above, such a contact may be a touch input which may be received in predetermined region 214 and may result in some functionality within the mobile communications device 210. Although the illustration in FIG. 2D shows a touch input by way of contact between a user's finger 220 and the touchscreen display 212, we do not mean to limit the capability of touchscreen display 212 to receiving touch input from a finger. Touchscreen device 212 may also be capable of receiving touch input as a result of contact with another object such as, for example, a stylus. In some embodiments, touch input may be accomplished by way of any object coming into contact with touchscreen display 212.

As shown in FIG. 2D, according to an embodiment of the invention, a list 222 of items may be presented incident to a touch input received by way of the predetermined region 214. Touch input may include any number of touch actions or gestures as described above. In one embodiment, only a single touch action such as, for example, a tap, is necessary to produce the functionality described herein with reference to the predetermined region 214. In an embodiment, a subsequent similar touch action such as a single tap may cause the reverse effect of discontinuing the presentation of, for example, the list 222. In an embodiment, the list 222 of items may provide a set of statuses of events. Statuses of events may include things such as whether a new event has occurred, the time since the last event occurred, whether an event has been responded to in some way, and the like. In an embodiment, the list 222 may present a list of items, each of which indicates that a new event of some kind has occurred.

In an embodiment, the presentation displayed incident to receiving touch input in the predetermined region 214 may be superimposed over the top of whatever is being displayed or interacted with on the touchscreen display 212 such that the presentation does not interfere with anything associated with that which is being displayed on display 212. Also, the presentation may be displayed without having to first (or concurrently) transition away from the screen being displayed previous to receiving touch input to predetermined region 214.

For example, a contacts menu may be displayed on touchscreen display 212 before touch input is received in the predetermined region 214. A user may be interacting with the contacts menu such as by creating a new contact, selecting an existing contact, editing an entry and the like, when the user decides to provide touch input to the predetermined region 214. In an embodiment, upon receiving that touch input, the listing 222 may be superimposed over the top of the contacts menu without changing the state of any functionality or display characteristics associated with the contacts menu. Thus, when the user causes a further touch input to the predetermined region, in an embodiment, the list 222 may be removed from the display, revealing the contacts menu, which may be displayed in exactly the same state that it was before the user interacted with the predetermined region 214. This way, new events or other information may be viewed without interrupting the functionality of a current application, and without having to exit or transition from a current screen to another.

Additionally, touch input by way of predetermined region 214 may result in a presentation of information 224 associated with one or more of the dynamic icons 216. Although both the list 222 and the information 224 are illustrated in FIG. 2D, in another embodiment, only a list 222 is presented incident to receiving touch input to the predetermined region 214. In a further embodiment, only the information 224 is provided incident to receiving touch input to predetermined region 214. In still further embodiments, either one or both of the list 222 and/or the information 224 may be provided depending on any number of circumstances which may be addressed by incorporating particular rules or conditions, as understood by those skilled in the art, into the programs and other code that control the functionality of device 210. For example, in one embodiment, the information 224 may always be displayed incident to receiving touch input to the predetermined region 214, even though the list 222 may not be displayed.

Figure 2E:
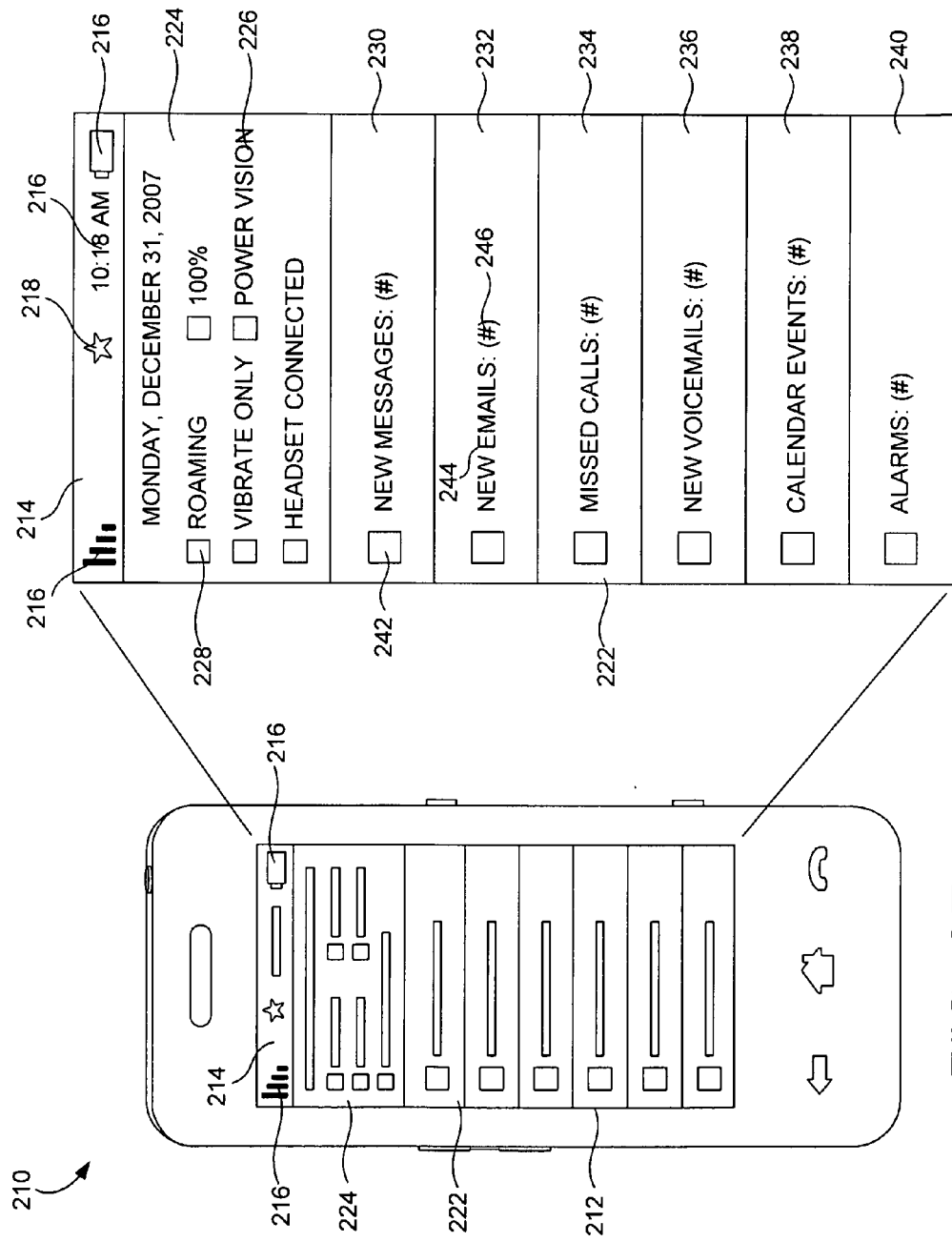
FIG. 2E depicts a listing of statuses of events and other information provided incident to a touch input at a predetermined region on a display of a mobile communications device in accordance with embodiments of the present invention.

Turning to FIG. 2E, additional detail is provided to help describe the nature of the information 224 and list 222, which are blown up for detail, that are provided incident to receiving touch input by way of predetermined region 214. As shown in the figure, the information 224 may include information associated with any number of the dynamic icons 216 provided in the predetermined region 214. In an embodiment, the information 224 provides explanation or detail regarding the icons 216. As illustrated in FIG. 2E, information in the form of text 226 is provided which indicates an aspect of the state of the device 210 that corresponds to information indicated by one or more of the icons 216. An image 228 is also provided. The image 228 may include a duplicate of a dynamic icon 216, a check box, or any other image.

Moreover, the contents of the information 224 may be somewhat static, completely static, somewhat dynamic, or completely dynamic. For instance, in an embodiment, the information 224 may always contain images of icons and text describing what the icons represent. In other embodiments, the icons and associated text provided may vary depending on which icons are presented in the predetermined region. In another embodiment, the information 224 may present a duplicate icon along with text explaining the status of the functionality represented by the icon, which may vary depending on the state of the device 210. In still a further embodiment, text may be provided along with a check box, that when checked indicates that the subject matter of the text is relevant to the current state of the device 210. Any number of combinations of the above examples, including other possibilities and configurations are possible and are intended to be within the ambit of the present invention.

With continued reference to FIG. 2E, a list 222 of items 230, 232, 234, 236, 238, 240 is shown. In an embodiment, the list 222 may contain fewer items than illustrated, and in another embodiment, the list 222 may contain more items than illustrated. In one embodiment, the list 222 may contain more items than will fit within the display area of the touchscreen display 212 and a scrolling function may be provided to display additional items. The items 230, 232, 234, 236, 238, 240 present statuses of events such as, for example, new events. New events may be events that have occurred without any notification other than that presented within the list 222.

That is, in one case a user may be interacting with a screen that lists text messages received. While interacting with or viewing that screen, a new text message may be received. In this case, the user may be notified of the receipt of the new text message by seeing an indication on the screen with which the user is interacting. In one embodiment, this new message is not included as a new event in the listing 222. However, in a similar embodiment, if a new voicemail is received while the user is interacting within the text message screen, the new voicemail may be included in the listing 222 as a new event.

In other embodiments, an event may be included in the list 222 so long as the event has not been acted on by a user. That is, so long as a user does not view, reply to, interact with, or in some other way confirm receipt or notification of the event, the event may be included in the list 222. In still further embodiments, the list 222 may be adapted to be configured by a user such that the user can determine the conditions under which an event will be included in the list 222. Similarly, any number of possibilities exist for the type of status of an event that may be reflected in the listing 222 of statuses, as will be understood by the description above.

In an embodiment, the list may include any number of items 230, 232, 234, 236, 238, 240 that present statuses of events. The items 230, 232, 234, 236, 238, 240 may be dynamically updateable, in that their presentation may vary as new events occur, as statuses of events change, etc. In an embodiment, the list 222 only includes items 230, 232, 234, 236, 238, 240 that correspond to a particular status such as "new." Thus, for example, if the only new event that the device 210 has received (or has observed the occurrence of) the list 222 may only present that single item. In another embodiment, the list 222 may present a set of statuses for events wherein the set of events represented remains consistent, but the notification of the statuses changes. This feature may also be one that is inherent to the functionality of the device 210, or in other embodiments may be a feature that is configurable by a user or service provider.

As shown in FIG. 2E, an item 230, 232, 234, 236, 238, 240 within the listing 222 may include any number of types of information. In an embodiment, a text string 244 is provided which indicates the type of event associated with the particular item 232. Each item 230, 232, 234, 236, 238, 240 may contain such a text string. Additionally, an image 242 is provided, as shown in item 230. The image 242 may be any type of image, and in one embodiment, the image corresponds to the type of event associated with the item 230. In another embodiment, the image 242 corresponds to the specific event that corresponds to the item 230. For example, if a new email is received, the item 232 representing that new event may include an image 242 that includes a picture of the sender of the new email. In a further embodiment, an image is not provided. Additionally, an indicator 246 is provided that indicates the number of new events associated with a particular type of event. Thus, for example, if one new email has arrived, the indicator 246 may be a numeral "1." The information presented within an item 230, 232, 234, 236, 238, 240 may take any number of different forms and may be preset, determined by a service provider, a user, or any other party or functionality.

In an embodiment, items 230, 232, 234, 236, 238, 240 are capable of being interacted with by touch input, which can include focus interactions or even motion gestures. That is, each of items 230, 232, 234, 236, 238, 240 may include a particular region or area of the touchscreen display 212 that is capable of receiving touch input. Upon receiving touch input to an item 230, 232, 234, 236, 238, 240, further information may be presented. That further information, in an embodiment, corresponds to the event or events associated with the item that received touch input. For example, incident to receiving touch input to the item 232 associated with receipt of a new email, further information such as the time, sender, subject, etc., of the email may be provided. In another embodiment, touch input to item 232 may result in the presentation of the text of the new email. In still further embodiments, touch input to item 232 may cause the presentation of an email inbox, listing all or a portion of received email messages. It will be appreciated that any number of the above, combinations of the above, or other configurations may be utilized in presenting further information incident to receiving touch input to an item.

Figure 3A:
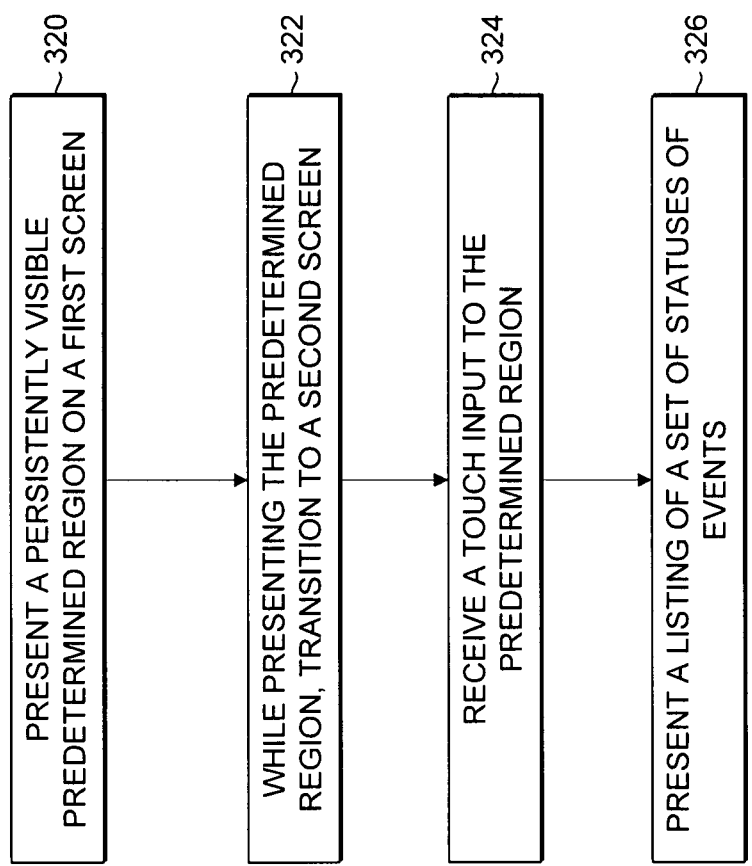
FIGS. 3A-3C depict illustrative methods of presenting on a user interface of a mobile communications device of a persistently visible predetermined region capable of receiving touch input in accordance with embodiments of the present invention.

To recapitulate, we have described an aspect of the invention that relates to performing a method of presenting on a user interface of a mobile communications device a persistently visible predetermined region capable of receiving touch input. With reference to FIG. 3A, one embodiment of this method includes, at a step 320, on a user interface, presenting a persistently visible predetermined region capable of receiving touch input on a first screen. The first screen on which the predetermined region is presented may present a first set of information. Additionally, the predetermined region is capable of being interacted with by way of a touch input such that receiving a touch input to the predetermined region causes a listing of a set of statuses of events to be presented, as described above.

The first set of information may include any information associated with a feature, aspect, functionality, option, etc., of the mobile communications device. For example, the first screen may include a menu that presents information in the form of items that correspond to further menus, lists, applications, or other features. We do not mean to limit the scope of the first set of information as used herein, and recognize that the first set of information may be anything displayable on a display device of a mobile communications device, and may include text, objects, items, graphics, and the like.

A step 322 includes transitioning to a second screen that presents a second set of information while presenting the predetermined region. The second set of information, like the first set of information, may include anything displayable on a mobile communications device. Additionally, the predetermined region is persistently viewable during and after the transition. At a step 324, a touch input is received to the predetermined region. Incident to receiving the touch input, at a step 326, a listing of a set of statuses of events is presented. As indicated above, the listing may be presented without affecting the functionality of the second screen, and may be superimposed over the second set of information, such that a subsequent touch input may remove the listing, revealing the second set of information associated with the second screen.

Figure 3B:
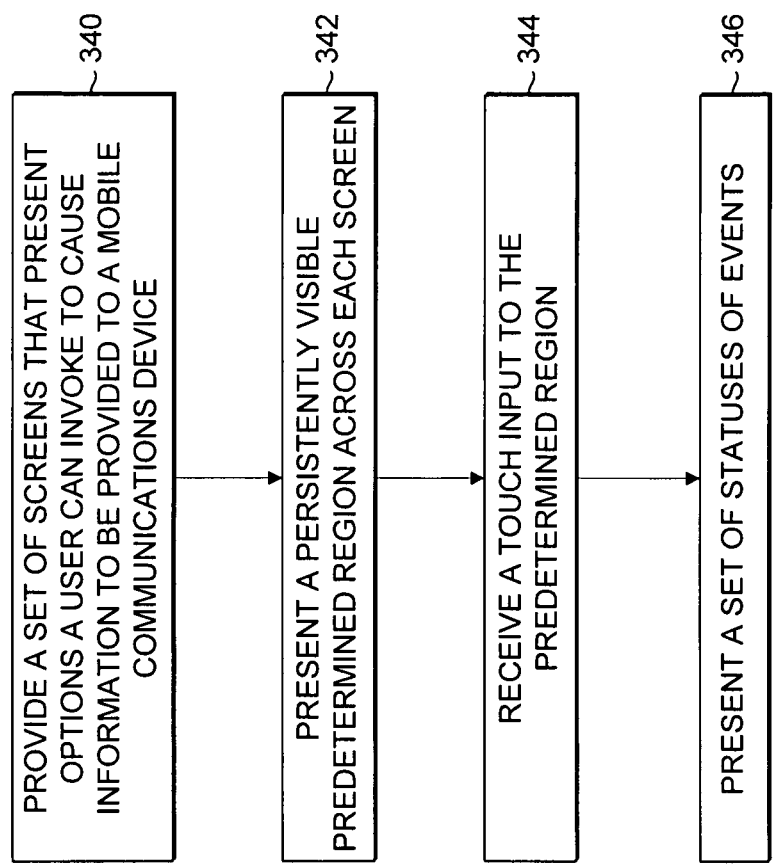

With reference to FIG. 3B, another embodiment of the invention is provided that includes, at a step 340, providing a set of screens that present options that a user can invoke to cause information to be provided to the mobile communications device. Generally, one of the set of screens is displayed at any given time. It will be appreciated that the options presented may include any number of objects, items, buttons, and the like that allow a user to interact with various features, functions, applications, etc. These options may include objects, information, representations, items, and the like as described herein and elsewhere within this disclosure as well as those that are not described.

At a step 342, a persistently visible predetermined region capable of receiving touch input is presented across each of the screens such that the predetermined region is never unavailable when any one of the screens is presented. At a step 344, touch input is received to the predetermined region, and incident to receiving that touch input, at a step 346, a set of statuses of events is displayed on a display of a mobile communications device.

Figure 3C:
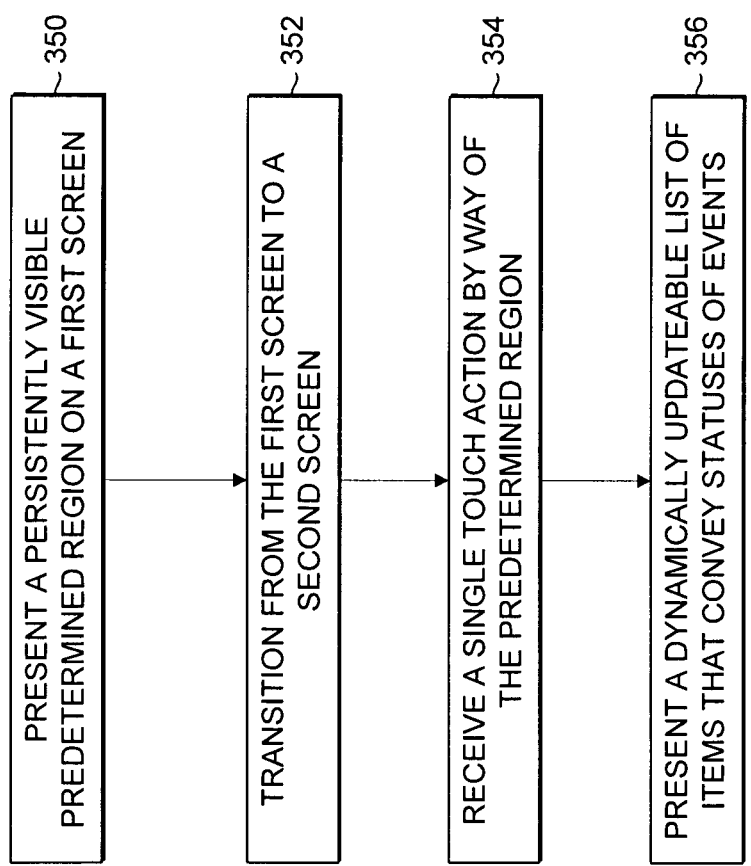

With reference to FIG. 3C, another embodiment of the present invention is provided that includes, at a step 350, presenting a persistently visible predetermined region on a first screen of a mobile communications device. The persistently visible predetermined region is capable of receiving touch input. A step 352 includes transitioning from the first screen to a second screen, wherein the predetermined region is persistently visible from the second screen in the same manner as it was on the first screen. At a step 354, a single touch action is received by way of the predetermined region. In an embodiment, a single touch action includes only one contact such as a tap from a finger or stylus in the predetermined region. It is important to note that the single touch action does not include transitioning away from the second screen, and that nothing about the display or functionality of the second screen is affected incident to the single touch action received in step 354.

In a final illustrative step, step 356, a dynamically updateable list is presented which includes at least one item that conveys a status of an event. If an event experiences a change from a first state to a second state, the change is reflected in the list. It should be understood, in light of the description above, that a change in status as described herein may include any number of status changes related to an event such as the receipt of a new event, an aging of a previous event by a certain duration, an updated event, an occurrence of a calendared event, and the like.

Correcting Data Inputted into a Mobile Communications Device

An aspect of an embodiment of the present invention includes an ability to input and correct data inputted into a mobile communications device using a touchscreen. In one embodiment, a way to input data (e.g., text, character strings, etc.) is to provide a modal keypad on a touchscreen display of a mobile communications device that is capable of receiving touch input. Character strings and other text inputted by way of the modal keyboard is checked against recognized character strings, and an option for automatically correcting incorrectly inputted character strings is provided.

Turning to FIG. 4A, a mobile communications device 410 is shown. As before, we use a separate reference numeral to help map the instant text to a relevant figure, but we do not mean to convey that mobile device 410 is different than any of the other many references to a mobile device throughout this disclosure, including the block-diagram representation of FIG. 1 and the mobile device shown in FIGS. 2A-2E. Mobile device 410 includes a display 412, which in one embodiment is a touchscreen display that is able to receive input by way of touch actions or interactions. Touchscreen display 412 may be adapted to receive any number of types of touch actions such as single touches, taps, slides, or other gestures. Additionally, in various embodiments, touchscreen display 412 may be adapted to receive multiple simultaneous touch actions that may generate a type of input distinct from input generated by a single touch action. Further, touchscreen display 412 may be adapted to receive touch input by way of contact with any number of objects such as, for example, a finger or a stylus.

Touchscreen display 412 includes a region 414 that contains various icons, indicators, and the like. In one embodiment, the region 414 is a persistently visual predetermined region capable of receiving touch input, as described above. In another embodiment, region 414 may be adapted to contain any number of icons or indicators of any kind. In a further embodiment, touchscreen display 412 does not contain a region 414.

Touchscreen display 412 is shown to display a modal keypad 416. As used herein, a modal keypad includes a set of objects that are displayed on a touchscreen display 412 of a mobile communications device 410, where each of the set of objects represents a letter, number, punctuation mark, or other character or set of characters. The modal keypad 416 may also include other objects representing buttons that have other functionality associated therewith such as, for example, a space bar, a return key, and a caps-lock button, as shown in row 418 of FIG. 4A. Other such objects may include, for example, a "done" button, a screen-toggle button (for toggling between different screens such as a modal keypad and a screen showing only character input), or a keypad-toggle button (such as a button for toggling between a keypad having letters to a keypad having numbers), as shown in row 420 of FIG. 4A.

Each of the objects displayed as part of the modal keypad 416 are capable of receiving touch input so that a user may interact with them in a conventional manner. In an embodiment, touch input to an object representing a character or characters causes that character or characters to appear as text on a viewing screen 422 provided on the touchscreen display 412. Viewing screen 422 displays characters 424 inputted by way of touch actions to the modal keypad 416 and may be oriented in any number of manners. Although viewing screen 422 is shown, in FIG. 4A, as oriented above the modal keypad 416, we do not intend to limit embodiments to this orientation. Viewing screen 422 may be oriented above, below, within, to the side, or in any other manner with respect to modal keypad 416. One such alternative orientation, for example, is depicted in FIG. 4C, which shows a "landscape" oriented modal keypad 416 and viewing screen 422.

Figure 4C:
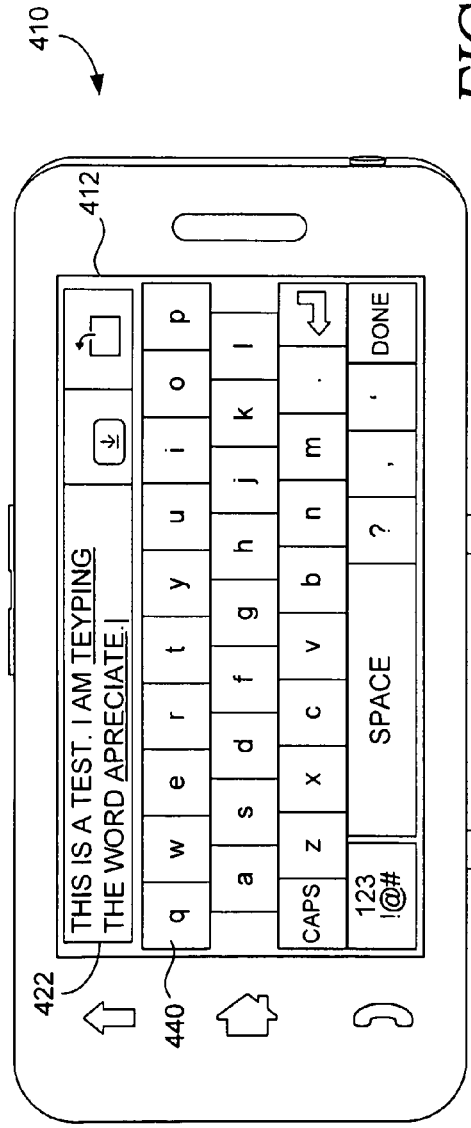
FIGS. 4C and 4D depict examples of landscape-oriented modal keypads suitable for use in implementation of various embodiments of the present invention.

With continued reference to FIG. 4A, modal keypad 416 may include any number of arrangements of objects therein, and although we only illustrate a few of the possible configurations herein, we do not intent to limit the arrangements that other embodiments of the present invention may employ. For example, in one embodiment, modal keypad 416 may include all of the letters of an alphabet, listed in order in rows, as shown in FIG. 4A. It will be appreciated by those skilled in the art, that modal keypad 416 may be provided with objects representing characters of any language, including but not limited to, mathematic and scientific languages. Modal keypad 416 may, as indicated above, also be presented in any number of arrangements such as the "landscape" arrangement shown in FIG. 4C.

Turning briefly to FIG. 4C, a mobile communications device 410 is shown. Touchscreen display 412 includes a modal keypad 440, oriented in a "landscape" fashion. That is, the characters displayed within the modal keypad 440 are positioned such that they are upright when the phone is held sideways, wherein the axis connecting the top and bottom of the device 410 is parallel with the ground. The "landscape" orientation is known in the art, and we do not mean to vary the general impression that the use of that word gives to the reader. Modal keypad 440 is disposed just below viewing screen 422. In an embodiment, a modal keypad may be arranged with alphabetical characters arranged in a typical "QWERTY" keyboard fashion, as illustrated in FIG. 4C. In other embodiments, some of which may include characters from languages other than English, the characters may be arranged in any number of other ways. We do not intend to limit the arrangement possibilities by the illustrations provided herein, but illustrate only a few of the possibilities.

Figure 4D:
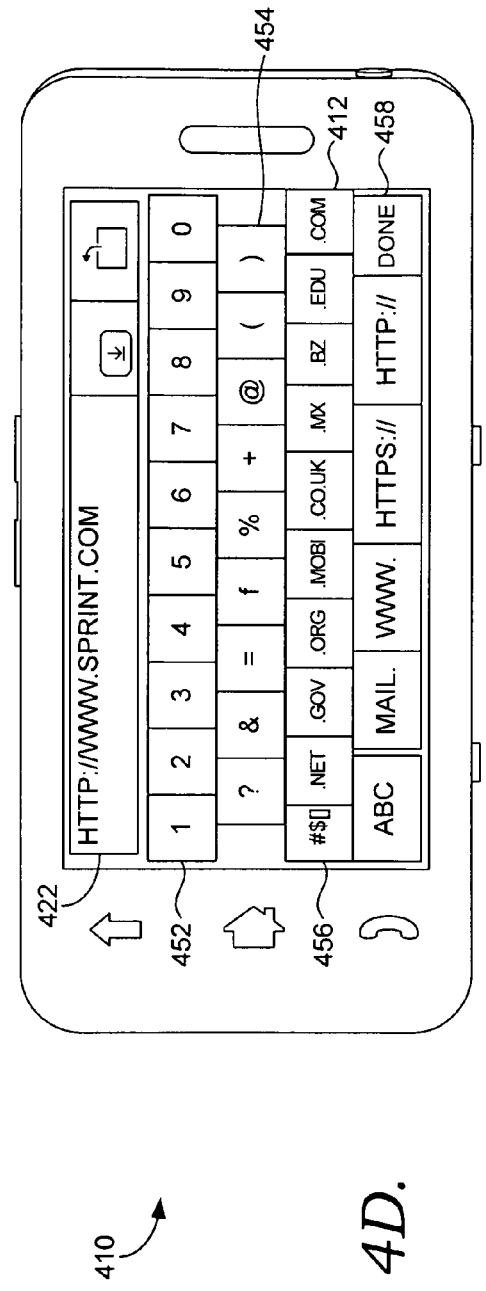

Additionally, whether the modal keypad is oriented as in FIG. 4A, as in FIG. 4C, or in some other manner, the modal keypad may contain any type of character that may be useful as character string input. For example, FIGS. 4A-4C illustrate modal keypads 416, 440 as displaying alphabetical characters (i.e., letters), and various punctuation marks. Other embodiments may include, as illustrated in rows 452 and 454 of FIG. 4D, characters such as numerals, various symbols, or even portions of character strings, as shown in FIG. 4D. In an embodiment such as the illustrative example of FIG. 4D, for example, a modal keypad 412 may include commonly used character strings such as portions of e-mail addresses (e.g., "MAIL.", ".org", ".com", etc.) or uniform resource locators, or portions, ("WWW.", "HTTP://", ".com", etc.), as shown in rows 456 and 458. It will be understood that any character strings or character string portions may be included in a modal keypad 416. In some embodiments, modal keypad 416 may be adapted to allow a user to choose the contents thereof, and may in other embodiments, allow the user to define the contents or objects included.

Returning to FIG. 4A, a set of character strings 424 representing text is shown as being displayed in viewing window 422. The viewing window 422 also includes a cursor 429 that indicates the position at which the next inputted character will be displayed. In an embodiment, inputted text or data represented by characters may be checked for accuracy such as, for example, by comparing the inputted character string to recognized character strings. Recognized character strings may be contained in any number of dictionary databases, such as, for example, database 114 as illustrated in FIG. 1. In an embodiment, inputted text or data takes the form of a user-entered character string. In one embodiment, a user-entered character string may be checked for accuracy after it has been inputted. In another embodiment, a user-entered character string may be continuously checked for accuracy while it is being entered.

For instance, in one embodiment, an application such as an input method application or predictive text application may compare the character string to recognized character strings as the user enters the character string, and the interpretation thereof may continuously change in pace with the user's entering of data, finally resting on a most likely interpretation when the user has completed entering data. For example, one such application that may be used or modified for this purpose is the XT9 Smart Input predictive text solution, available from Nuance Communications, Inc. of Burlington, Mass. In one embodiment, the continuous results of the accuracy may be displayed on the touchscreen display 412 as the user enters the character string. In another embodiment, the continuous results may not be displayed on the touchscreen display 412, and only the final interpretation may be displayed. In yet another embodiment, none of the interpretations or corrections may be displayed, where the exact characters that the user has entered will be displayed. It will be appreciated by those skilled in the art that the correction application may be configured in any other manner, so long as it is configured to compare, in some way, user-entered character strings to recognized character strings. Recognized character strings may include correctly spelled words, commonly used words (although incorrectly spelled), or any other type of word or character string that is included in the dictionary database. In some embodiments, as described further below, one or more of the recognized character strings contained in a dictionary database may be entered into the database by a user or other individual, application, program, or functionality.

In any of the embodiments described above, when a user-entered character string is received, the device 412 may determine one or more suggestions for replacing the user-entered character string. In an embodiment, suggestions for replacing the user-entered character string may be determined only in the case where the user-entered character string is not a recognized character string. In other embodiments, suggestions may be provided regardless of whether the user-entered character string is recognized. In still further embodiments, the determination of suggestions may be dependent upon any number of factors, which may be established by a programmer, an application, or even a user, for example. Suggestions may include other character strings containing similar characters, character arrangements, and the like, and may be further based upon other factors such as context, dialect, grammar, and the like. Any number of suggestions may be determined. In one embodiment, for example, one or two suggestions may be determined. In another embodiment, three or more suggestions may be determined. In various embodiments, the number of suggestions determined may also be based upon various factors such as, for example, those described above.

In an embodiment of the present invention, after determining a suggestion for replacing a character string, the user-entered character string may be marked with a visual indication that a suggestion for replacement thereof has been determined. In an embodiment, as shown in FIG. 4A, such a visual indication may include underlining the user-entered character string. In other embodiments, other types of visual indications may be used such as, for example, highlighting, bolding, or displaying the user-entered character string in a different color. We do not intend to limit the possibilities that may be used for marking a character string with a visual indication as described herein, as any sort of visual indication may be sufficient to accomplish the goals and objectives of the various embodiments of the present invention.

In another embodiment, an automatic-correction function is provided. As shown in FIG. 4B, the automatic-correction function may operate in much the same way as above, but includes automatically replacing the user-entered character string 426, 428 with a suggested character string 430, 432. In some embodiments, the suggested character string 430, 432 that replaces the user-entered character string may include the first suggested character string determined. In other embodiments, the various suggested character strings determined may be ranked according to the likelihood that a user intended to enter any one of the various suggested character strings when the user actually entered the user-entered character string, and the suggested character string 430, 432 used to replace the user-entered character string may be the character string with highest ranking. In other embodiments, the suggested character string 430, 432 used to replace the user-entered character string may be determined by any number of other factors and is not meant to be limited by our disclosure herein.

In an embodiment, the suggested character string 430, 432 that replaces the user-entered character string may be marked with a visual indication that the suggested character string 430, 432 has replaced the user-entered character string 426, 428. The visual indication may take any form, as described above with respect to the user-entered character string. In an embodiment, for example, as shown in FIG. 4B, the suggested character string 430, 432 may be marked with a visual indication such as by underlining the suggested character string 430, 432. As above, the suggested character string 430, 432 may also be marked by bolding, highlighting, changing its color, and the like.

Additionally, in an embodiment, an input region 434 is provided that is associated with the visual indication, whether the visual indication corresponds to a user-entered character string 426, or a suggested character string 430. The input region 434 is capable of receiving touch input. Upon receiving touch input to the input region 434, which may be defined by any amount of space surrounding and/or including the character string having the visual indication, a set of alternative suggestions for replacing the character string may be provided. In an embodiment of the present invention, cursor 429 may be unaffected by user input to the input region 434. That is, even though a user may interact with the input region 434, the cursor 429 will remain in the position in which it was before the user interacted with input region 434, thus allowing for a user to perform editing and be able to rapidly return to inputting data.

Figure 4E:
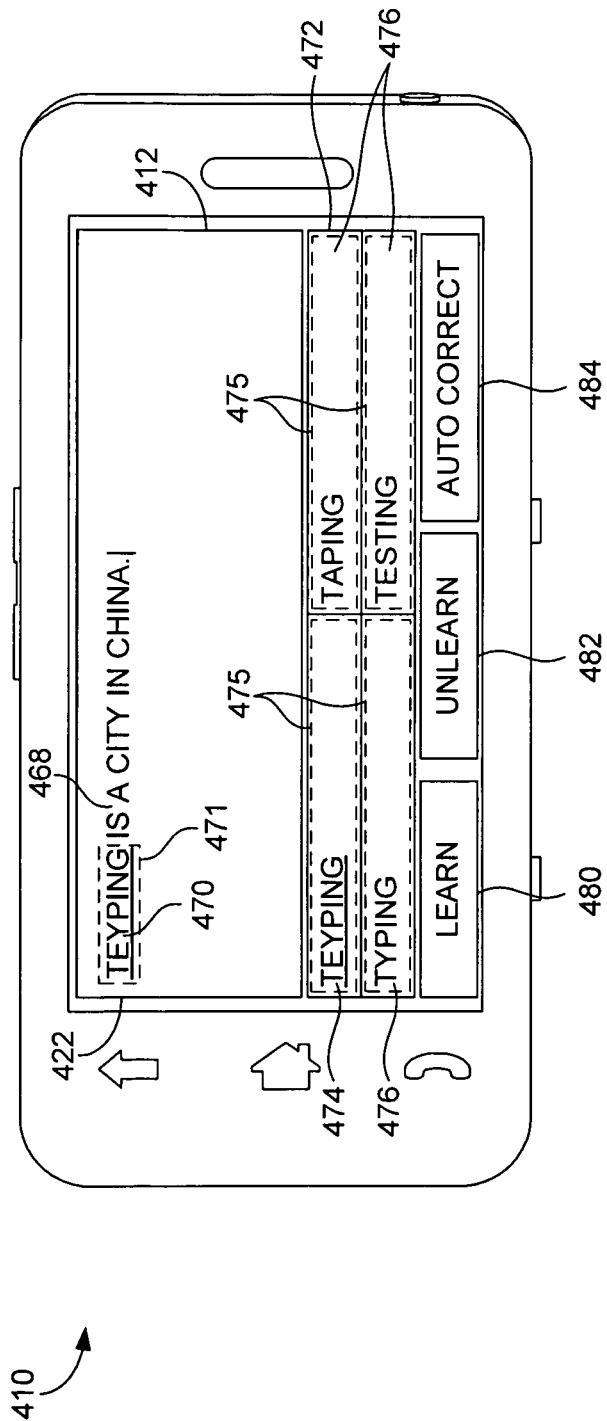
FIG. 4E depicts an exemplary set of alternative suggested character strings and various user options on a display of a mobile communications device in accordance with embodiments of the present invention.

Turning now to FIG. 4E, a mobile communications device 410 is shown. On a touchscreen display 412, a viewing screen 422 contains a set of user-entered character strings 468. One of the user-entered character strings 470 is shown and has been marked with a visual indication that a suggested character string has been determined in relation thereto. Upon receiving user input to an input region 471, defined in association with the marked user-entered character string 470, a set of alternative suggested character strings 474, 476 is shown in a user interface 472. In an embodiment, user interface 472 may replace all or a portion of the modal keypad. In another embodiment, the user interface 472 may be provided in addition to the modal keypad, such as by providing the user interface within some region of the viewing screen 422.

It should be understood that, although we illustrate four alternative suggested character strings, any number of alternative suggested character strings may be provided. For example, in an embodiment, one, two, or three alternative suggested character strings may be provided. In a further embodiment, five or more alternative character strings may be provided.

In another embodiment, a button 484 capable of receiving touch input may be provided for allowing a user to select an active or inactive state corresponding to the automatic-correction function. In other words, a user, by interacting with a button 484, may be able to turn the automatic-correction function on or off. It will be appreciated that the automatic-correction function may also be toggled between the active and inactive states in any number of other ways. For example, in one embodiment, the option for setting the auto-correction function to a particular state may be provided in a menu such as, for example, a settings or options menu. In other embodiments, the option for selecting between active and inactive states for the automatic-correction function may be presented in a predetermined region of the touchscreen. In a further embodiment, for example, the option may be available as a series of keystrokes or by a particular touch input anywhere or in a certain region of the touchscreen display. It will be further appreciated by those skilled in the art that any number of additional buttons, options, and the like may be provided for allowing a user to perform any number of other functions by interacting therewith.

In an embodiment, each of the alternative suggested character strings 474, 476 has at least one character in common with the user-entered character string. In other embodiments, the alternative suggested character strings 474, 476 include the user-entered character string 474. In another embodiment, the set of alternative suggested character strings 474, 476 includes a suggested character string that is used to automatically replace the user-entered character string, in which case the character string 470 may actually have been replaced by a character string such as suggested character string 476. Each of the alternative suggested character strings 474, 476 may also have an associated input region 475 capable of receiving touch input. In an embodiment, incident to receiving touch input to an alternative suggested character string 474, 476 by way of an associated touch region 475 the user-entered character string 470 is replaced by the alternative suggested character string with which the input region is associated.

For example, as shown in FIG. 4E, a user may have entered the character string "TYEPING" where the user actually meant to enter the word "TYPING." Unless the user-entered character had been automatically replaced by the word "TYPING," the user may cause that replacement to occur by causing touch input to the input region 475 associated with the alternative suggested character string 476 "TYPING." However, it may be the case that the user does not wish to replace the user-entered character string with a suggested character string. If the automatic-correction function had previously caused the replacement to occur, the user may undo the replacement by simply causing touch input to the input region 475 associated with the user-entered character string "TEYPING." In some cases, a user may wish to add a user-entered character string as a recognized character string in the dictionary database of the device 410.

In an embodiment, the user interface presents a "learn" button 480 and an "unlearn" button 482, as shown in FIG. 4E. Each of the buttons 480, 482 is receiving touch input. Upon receiving touch input to the "learn" button 480, a selected user-entered character string 470 may be added to the dictionary database such that the user-entered character string 470 becomes a recognized character string. In an embodiment of the present invention, as a recognized character string, the user-entered character string 470 may not be subject to correction and/or alternative suggested character strings being provided in the future. Additionally, the now-recognized user-entered character string 470 may be used as an alternative suggested character string in the future. Other embodiments provide for adding, or learning, a user-entered character string automatically such as by entering a user-entered character string into the dictionary database after receiving input comprising that character string a plurality of times. It will be appreciated by those skilled in the art that various configurations are possible to accomplish this same objective, as well as that such an automatic learning function may be implemented in addition to any number of the various features described herein.

In an embodiment of the present invention, upon receiving touch input to the "unlearn" button 482, a suggested character string may be removed from the dictionary database. For example, a user may spell a name incorrectly several times, causing the incorrect spelling to be automatically learned by device 410. The user may then, upon receiving that spelling as a suggested character-string, interact with an "unlearn" button 482, causing the incorrect spelling to be removed from the dictionary database. This removal may be permanent or temporary, and it will be appreciated that such a function may be accompanied by functionality that accomplishes the reverse, such as an "undo" functionality. In various embodiments, the options described above (i.e., adding character strings to a database and removing character strings from a database), may be accomplished by means other than presenting a "learn" and "unlearn" button as illustrated. In various embodiments, other types of objects may be presented on the screen for a user to interact with. In other embodiments, rules may be established such that one or both of the functionalities are invoked incident to some sequence of events such as, for example, the repetitious use of a particular character string. In still further embodiments, a user may interact directly with the character string as it is represented on the screen in order to add to or remove from a dictionary database.

Figure 5A:
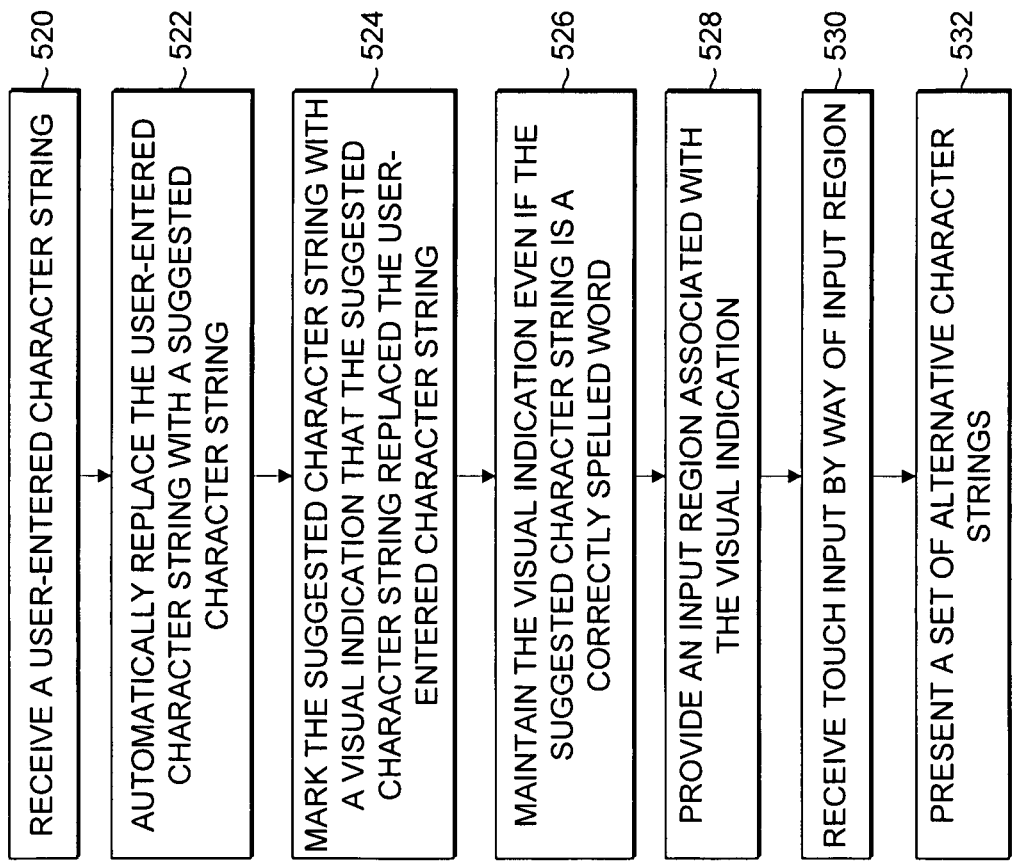
FIGS. 5A-5C depict illustrative methods of inputting data into a mobile communications device having a touchscreen in accordance with embodiments of the present invention.

To recapitulate, we have described an aspect of the invention that relates to performing a method of inputting data into a mobile communications device having a touchscreen. With reference to FIG. 5A, one embodiment of this method includes, at a step 520, receiving a user-entered character string. As described above, a user-entered character string can include any string of any type of characters such as, for example, a word, a number, a series of symbols, and the like. Additionally, a character-string, as used herein, may be expressed in any written language, as well as any mathematical or scientific language. In some embodiments, the user-entered character string may be a misspelled word. In other embodiments, the user-entered character string may be a correctly spelled word. In still further embodiments, the user-entered character string may not be a word, but rather a number, a URL, an e-mail address, etc. Additionally, in an embodiment, the user-entered character string is not recognized by the mobile communications device.

At a step 522, the user-entered character string is automatically replaced with a suggested character string. In various embodiments, the suggested character string is a correctly spelled word that has at least one character in common with the user-entered character string. In other embodiments, the suggested character string may be a correctly spelled word, and in some embodiments, the suggested character string may be an incorrectly spelled word. Generally, the suggested character string is one that is contained within a dictionary database associated with the mobile communications device.

Continuing with FIG. 5A, at a step 524, the suggested character string is marked with a visual indication that the suggested character string replaced the user-entered character string. In an embodiment, the suggested character string is underlined. In other embodiments, the suggested character string may be highlighted, bolded, or presented in a different color than other character strings. It should be appreciated that any suitable visual indication may be used to mark the suggested character string. As indicated at a step 526, the visual indication is maintained even if the suggested character string is a correctly spelled word. At a step 528, an input region is provided in an area on the touchscreen in which the suggested character string is displayed. The input region provided at step 528 is associated with the visual indication and is capable of receiving touch input. Thus, for example, a user may "tap" (i.e., cause touch input to) on a marked character string, such as a suggested character string that has been marked.

Accordingly, at step 530, touch input is received by way of the input region, and incident to receiving that touch input, as shown at step 532, a set of alternative character strings is presented. The set of alternative character strings includes suggestions for replacing the suggested character string. It will be understood that as suggested replacements for the suggested character string, the alternative character strings may also include alternative suggestions for replacing the user-entered character string. In an embodiment, each of the alternative character strings has at least one character in common with the user-entered character string. In another embodiment, each of the alternative character strings may have at least one character in common with the suggested character string. In further embodiments, the set of alternative character strings may include either or both of the user-entered character string and the suggested character string. In still further embodiments, an input region is provided which corresponds to each of the alternative character strings, such that a user may be able to "tap" on one of the alternative character strings to cause some functionality such as, for example, to cause the selected alternative character string to replace the suggested character string.

Figure 5B:
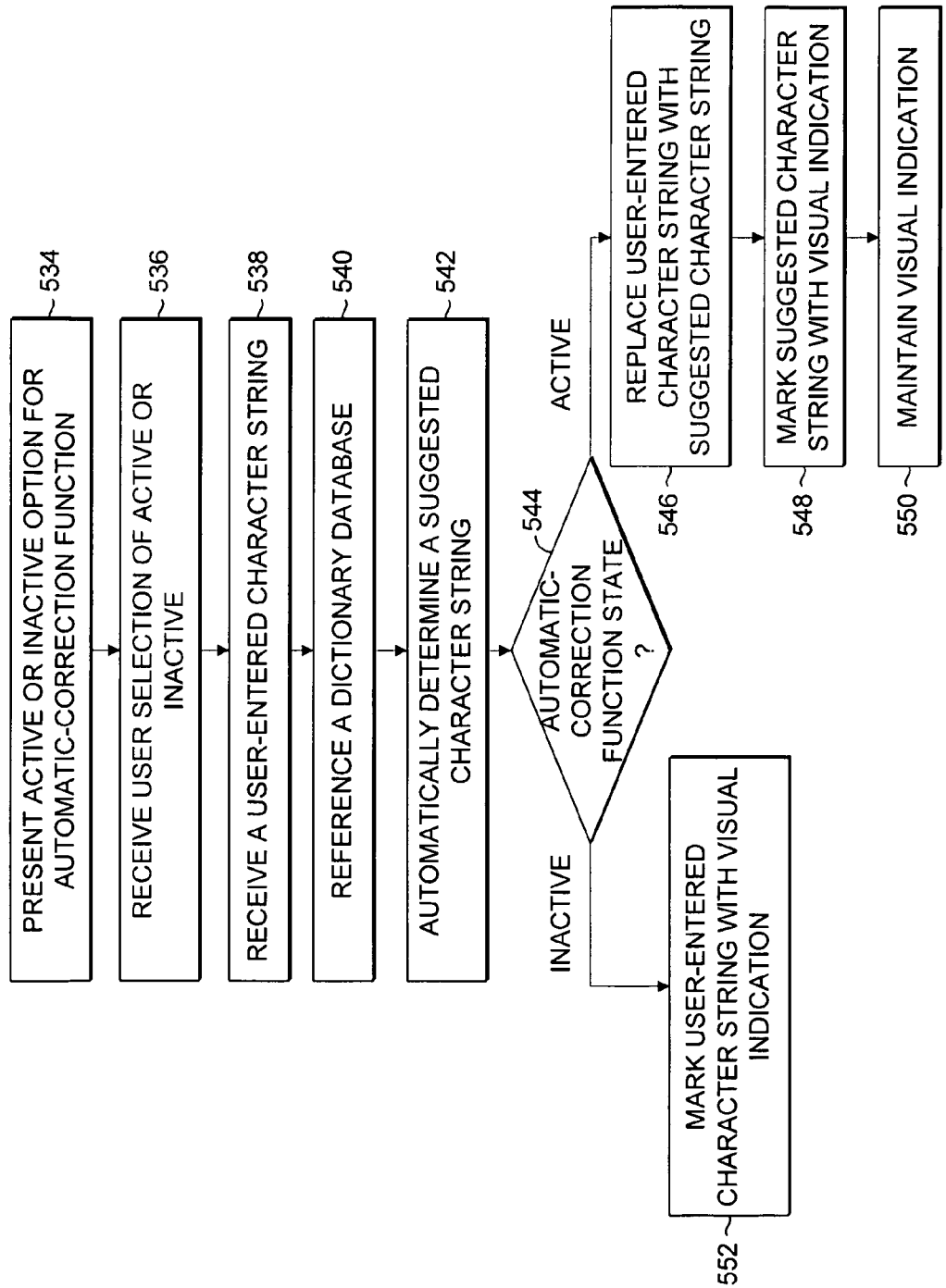

Turning to FIG. 5B, another embodiment of the present invention is illustrated by a flow diagram showing a method for inputting data into a mobile communications device having a touchscreen, including, at a step 534, presenting an option to a user that permits the user to select an active or inactive state associated with an automatic-correction function. As indicated previously, this option may be presented to the user in any number of ways such as, for example, presenting a button for toggling the states between active or inactive. At a step 536, a user selection of either an active or an inactive state associated with the automatic-correction function is received.

At a step 538, as shown in FIG. 5B, a user-entered character string is received. At a step 540, a dictionary database is referenced. A dictionary database generally includes recognized character strings, and referencing such a database may include an operation such as querying the dictionary database with a particular search term such as, for example, whether there is a character string or character strings within the dictionary database that have a certain number of characters in common with a user-entered character string. A dictionary database may actually include a plurality of databases. In an embodiment, a dictionary database may include several different databases, each containing a particular type of character string. For example, in various embodiments, a first database may be provided for housing recognized words, while another database may be provided for housing recognized URLs or email addresses. It should be understood that a dictionary database may be configured to contain any type of character string including numbers, formulas, abstract collections of symbols, portions of words, prefixes, suffixes, etc.

At a step 542, a suggested character string is automatically determined. In an embodiment, the suggested character string is a recognized character string from the dictionary database and is selected as a suggested replacement for the user-entered character string. The decision diamond 544 indicates an internal determination of whether the automatic-correction is in an active or inactive state, the state generally being dependent upon the user selection of step 536. If the automatic-correction function is in an active state, the illustrative method of FIG. 5B continues with a step 546 in which the user-entered character string is replaced with the suggested character string.

At a step 548, the suggested character string is marked with a visual indication that the suggested character string replaced the user-entered character string. As described above, this visual indication may take any form suitable such as, for example, underlining, bolding, and the like. Further, as illustrated at a step 550, that visual indication is maintained until a touch input is received that corresponds to an instruction to remove the visual indication. Such an instruction may be presented in any manner, so long as it is prompted by some purposeful touch input to the device. In an embodiment, an input region capable of receiving touch input and that corresponds to the visual indication may be provided. In one embodiment, incident to receiving touch input by way of the input region, a set of alternative character strings may be presented as suggestions for replacing the suggested (or the user-entered) character string. Additionally, in another embodiment, an option to select an inactive state associated with the automatic-correction function may again be presented at any time.

With continued reference to FIG. 5B, if the automatic-correction function is determined, at a step 544, to be in an inactive state, the user-entered character string is marked with a visual indication representing the determination of a suggested character string, as shown at step 552. Where a user has selected an inactive state associated with the automatic-correction function, user-entered character strings will be preserved just as they were inputted by the user. In this manner, the user may have an option to return to a given character string and edit it, preserve it, or replace it with a suggested character string, etc. In an embodiment, the user-entered character string that is marked may also have associated therewith an input region similar to the input region described above, with reference to the suggested character string. Incident to interacting with the input region associated with and generally presented in the same area of the touchscreen as the marked user-entered character string, a set of alternative character strings may be presented as suggestions for replacing the user-entered character string.

Figure 5C:
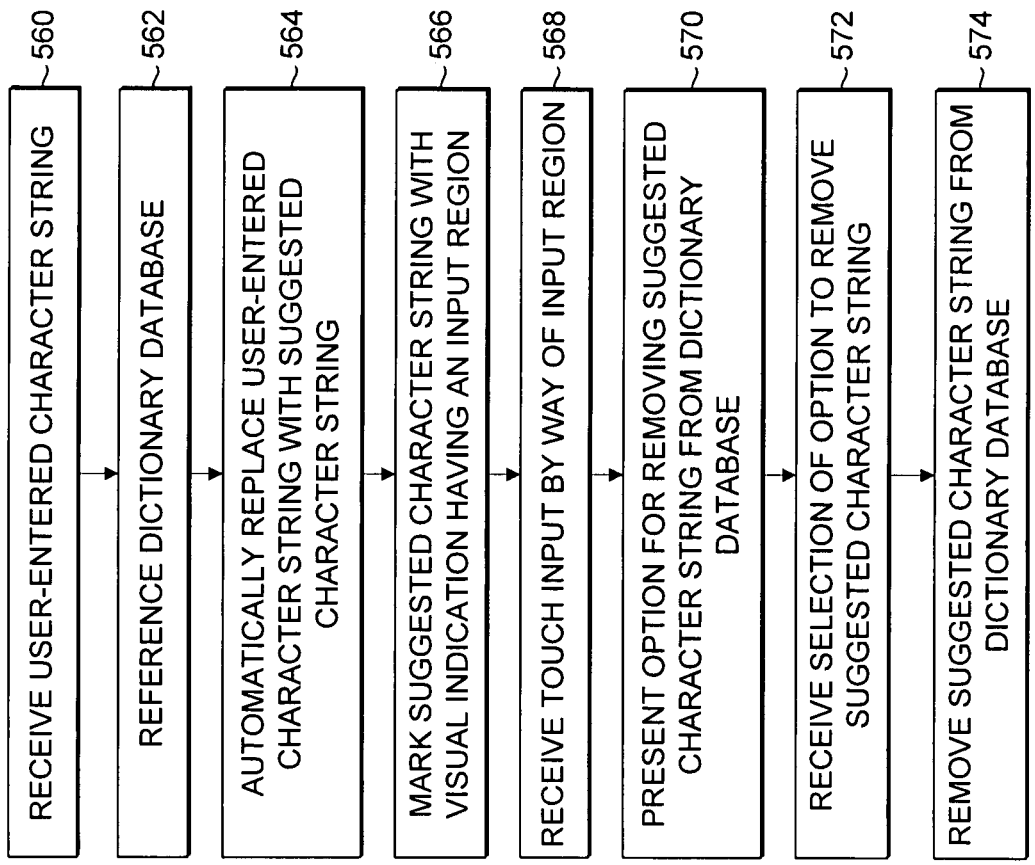

With reference to FIG. 5C, another illustrative embodiment of a method in accordance with the present invention is shown in a flow diagram. The illustrative method of FIG. 5C includes, at a step 560, receiving a user-entered character string. At a step 562, a dictionary database having a plurality of recognized character strings is referenced. In an embodiment, the dictionary database is referenced to determine whether it contains any suggested character strings for replacing the user-entered character string. At a step 564, the user-entered character string is automatically replaced with a suggested character string from the dictionary database.

As described above, with reference to FIGS. 5A and 5B, the suggested character string is marked, at a step 566, with a visual indication that the suggested character string replaced the user-entered character string. Additionally, as shown at step 566, the visual indication has an input region provided therewith. In an embodiment, the input region is capable of receiving touch input. Accordingly, at a step 568, touch input is received by way of the input region. Incident to receiving the touch input at the input region, at a step 570, an option is presented for removing the suggested character string from the dictionary database. It will be understood that an option for adding the user-entered character string (or any other character string) may be presented as well. The option or options provided at step 570 may, in an embodiment, be selected by way of a user acting upon the option with some sort of touch input.

At a step 572, a touch input representing a selection of the option to remove the suggested character string from the database dictionary is received. In another embodiment, an option to add the user-entered character string, or any other character string, to the dictionary database may be received. In a further embodiment, an option to take no action may be received, and in still a further embodiment, no option may be received. In the illustrative embodiment of FIG. 5C, however, incident to a selection of an option to remove the suggested character string from the database, at a step 574, the suggested character string is removed from the database. As will be appreciated by those skilled in the art, this illustrative step may also include replacing the suggested character string (i.e., in the viewing screen) with the user-entered character string, or with some other character string. In various other embodiments, as described above, any number of other options may be presented in response to receiving touch input to the input region. In some embodiments, interacting with actionable words does not change cursor position, thus allowing for rapid editing and continuing of a composition.

List-Position Locator

As referenced above, another aspect of an embodiment of the invention includes the ability to arrive at a desired position in an ordered list of items on a display. The ordered list of items is stored in a mobile communications device. In one embodiment of the invention, a user may select, by way of a touch action, a selectable option, which causes a positional indicator to appear on the display. The positional indicator is responsive to the movement of the selectable option, and indicates a corresponding position among the ordered list of items.

Figure 6:
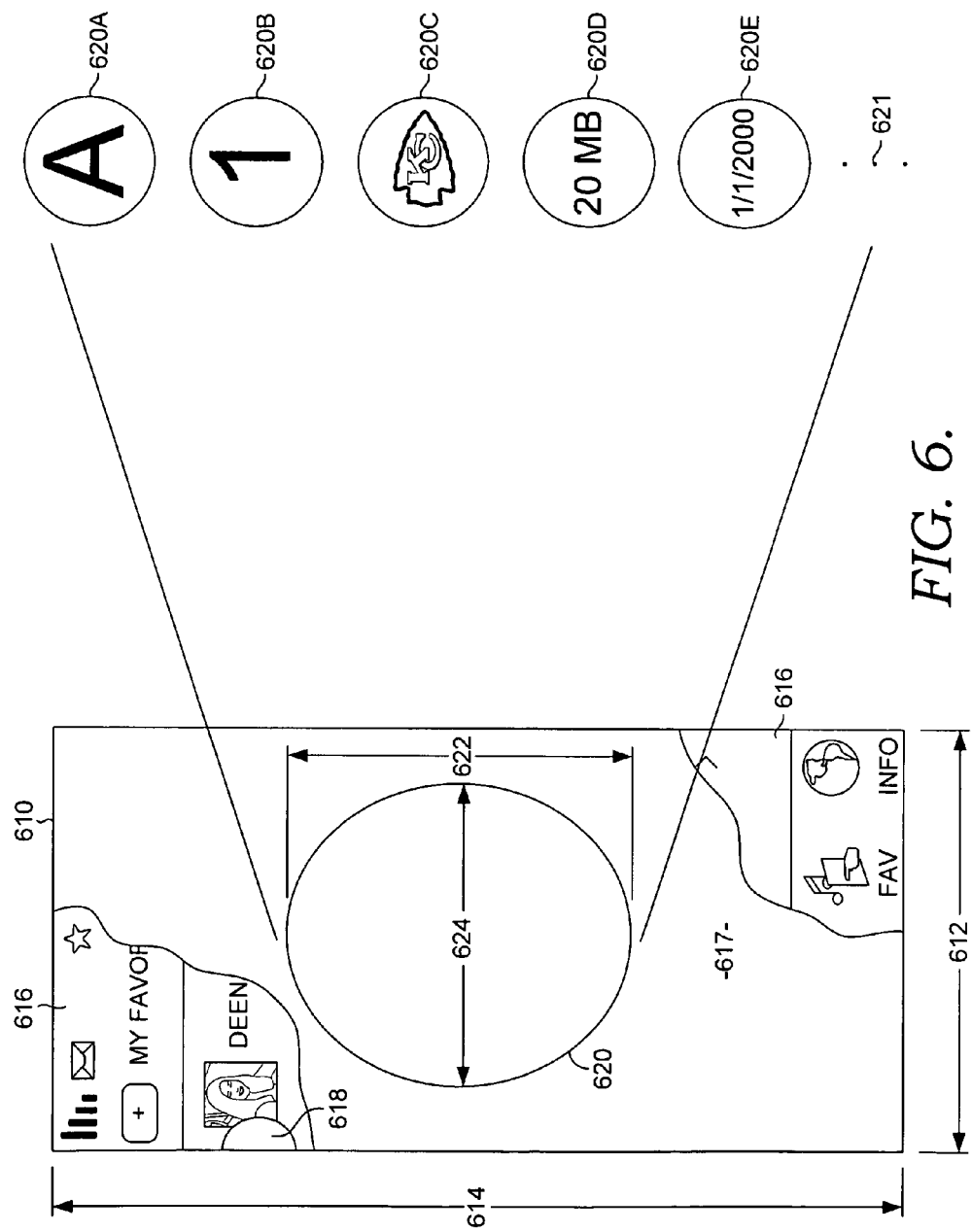
FIG. 6 depicts a selectable option and various examples of the indication provided by the positional indicator, in accordance with embodiments of the present invention.

Referring to FIG. 6, a representation of a display 610 of a mobile device, such as mobile communications device 210, is provided. We use a separate reference numeral to help map the instant text to a relevant figure, but we do not mean to convey that display 610 is different than any of the other many references to a display throughout this disclosure, including the block-diagram representation of FIG. 1. Display 610, in one embodiment, is a touchscreen display that is able to receive input by way of touch actions or other interactions. As previously mentioned, a touch action can be accomplished by receiving touch input from a user's finger, but we do not mean to limit the capability of a touchscreen display, such as display 610, to receiving touch input from a user's finger. Display 610 may also be capable of receiving touch input as a result of contact with another object such as, for example, a stylus, or a fingernail. In other embodiments, a touch action may be accomplished by way of any object coming into contact with display 610.

In some embodiments, a touch action may be accomplished by using a touch sensitive surface that may not be located on the 4 display 610, but that may be located on the side of the mobile device in the form of a touch sensitive strip. In other embodiments, the mobile device may include an optical sensor that is capable of detecting the motion of an object, such as a finger, fingernail, or stylus, through imaging. In addition, biometric finger print sensors may be used that detect motion of a fingerprint across the optical detector.

Numerals 612 and 614 represent the width and length, respectively, of the display 610. When the mobile device is vertically oriented, so that the user may view the display 610 in a portrait view, as represented by display 610 in FIG. 6, the length 614 may be greater than the width 612. The mobile device may also, in some instances, be horizontally oriented so that the user may view the display 610 in a landscape view. In these instances, the width of the display is now represented by numeral 614, and the length is 612. Here, the width 614 may be greater than the length 612. In some embodiments, however, the width and length may be equal.

Display 610 has a user interface 616, which is illustrated as a plurality of icons and data. We have included a portion of an exemplary user interface 616 in FIG. 6 to provide an illustration of what a user interface of display 610 may look like in some embodiments of the present invention. In these embodiments, user interface 616 is an ordered list of items that are stored in the mobile device, such as mobile communications device 210 as shown in FIG. 2. The ordered list of items may include, but is not limited to, contacts, photographs, videos, music, sports teams, and the like. The remaining portion of the user interface 616 is not shown in FIG. 6 in order to focus attention on the other elements of the present invention, such as the selectable option 618 and positional indicator 620, as described herein.

As mentioned above, an embodiment of the invention includes the ability to navigate through and reach a desired position among an ordered list of items. This may be achieved by moving a selectable option 618 in a direction allowed for by the mobile device. In embodiments, the selectable option 618 is capable of being moved by a touch action in a first direction, such as along the length 614 of display 610. Here, the user may move the selectable option 618 in this direction to navigate through an ordered list of items, as described above. In these and other embodiments, selectable option 618 is also capable of being moved in a second direction, such as along the width 612 of display 610. In these embodiments, the user may have located the desired item within the ordered listed of items, but there may be a subset list of items associated with the item that the user is able to navigate through. The user may then move selectable option 618, for example by a touch action, along the width 612 of display 610 to navigate through the subset list of items.

It should be noted that the selectable option 618 may indicate the overall list position in many embodiments. For example, if the ordered list of items is alpha sorted, or in alphabetical order, there may not be 26 evenly spaced regions (e.g., one evenly spaced region for each letter of the alphabet) in relation to the movement of the selectable option 618. In these embodiments, for instance, if the alpha sorted list includes only items beginning with the letter A through D, the selectable option 618, because it indicates the current location within the overall list of items, may appear at or near the bottom of the display 610 once the end of the list has been reached, even though the end of the list may be an item beginning with D, but not Z.

As described above, the selectable option 618 allows the user to navigate through an ordered list of items to reach a desired position among this list. To give the user an indication of the relationship between the position of the selectable option 618 and the current location in the ordered list of items, we have provided a positional indicator 620 that dynamically displays an indication of the current location within the ordered list of items. Examples of an ordered list of items, as discussed above include, but are not limited to contacts, photographs, videos, music, sports teams, and the like, all of which may be stored in the mobile device. Depending on how the items are arranged within the ordered list of items, the items may be in alphabetical order, numerical order, or ordered by date, time, size, or any other way that items may be arranged in a list.

As an example of the above, the ordered list of items is a list of contacts saved in the mobile device, and the contacts are ordered alphabetically by first name. Here, when the user selects the selectable option 618 by some type of touch action as described above, the positional indicator 620 is presented on the display 610. In one embodiment, the positional indicator 620 is presented on the display 610 incident to the user moving the selectable option 618 in any direction allowable by the mobile device. In another embodiment, the positional indicator is presented on the display 610 at some set time after the selectable option 618 is moved by the user's touch action. In still another embodiment, the positional indicator 620 is presented on the display 610 incident to the user's touch action, even before the selectable option has been moved. In various aspects of each embodiment described, the positional indicator 620 may gradually appear on display 610, so that the brightness of positional indicator 620 is displayed gradually. Positional indicator 620 may also gradually disappear in this same fashion.

Positional indicator 620, as previously described, dynamically indicates a corresponding position within the ordered list of items. Positional indicators 620A, 620B, 620C, 620D, and 620E represent various examples of the indication that may be provided to the user when moving the selectable option, as described above. As shown in FIG. 6, the positional indicator 620 takes on a form consistent with the types of items included in the ordered list of items. In one embodiment, a letter may be presented on the positional indicator, such as the letter "A" as shown on positional indicator 620A. In this embodiment, the list may be a list of contacts, sports teams, or any other list of items that can be ordered alphabetically. We have shown positional indicator 620B with the number "1" on it. If the list of ordered items can be ordered numerically, such as a list of phone numbers or addresses, a numerical value may be presented on the positional indicator 620B in these embodiments to provide the user with a corresponding position in the ordered list of items in relation to the position of the selectable option 618.

In another embodiment, the list may be a list of sports teams, such as a list of baseball teams, football teams, soccer teams, basketball teams, and the like. In this embodiment, the positional indicator, such as positional indicator 620C may present the logo representing the team where the selectable option is located. In one aspect of this embodiment, each team may have one or more items associated with it, such as recent scores, schedules, statistics, and the like, so that moving the selectable option 618 until the desired team logo appears on the positional indicator 620C provides the user with an efficient way to locate this information.

In some instances, the ordered list of items may include pictures, videos, or other items that can be ordered by size. In accordance with this embodiment, we have shown positional indicator 620D with "20 MB" presented on it, representing the file size of one or more items in the ordered list corresponding to the current position of selectable option 618. This may give the user an easy and efficient way to locate a certain item, such as a picture or video, if the file size is known or can be approximated. Moving to positional indicator 620E, we show an embodiment that presents "Jan. 1, 2000," representative of a date that may appear on a positional indicator if the ordered list of items may be ordered by date. Such lists may include events (e.g., calendar-related items), pictures, videos, and the like. As mentioned above, the positional indicator may take on a form consistent with the items in the ordered list, and as such, other indication information may be presented on the positional indicator other than what has been described above. As shown by numeral 621, these are contemplated to be within the scope of the present invention.

As we previously discussed, the width 612 and length 614 of the display are shown in FIG. 6. The display 610 is shown in a portrait view, wherein the positional indicator has a width 624 and length 622. In this view, the width of the positional indicator 624, in many embodiments, is greater than a majority of the display width 612. When the phone is turned in a landscape view (e.g., rotated 90 degrees from the portrait view), however, numeral 612 represents the length of the display, and numeral 624 represents the length of the positional indicator. Here, the length of the positional indicator 624 may, in some embodiments, be greater than a majority of the width of the display 612.

Figure 7:
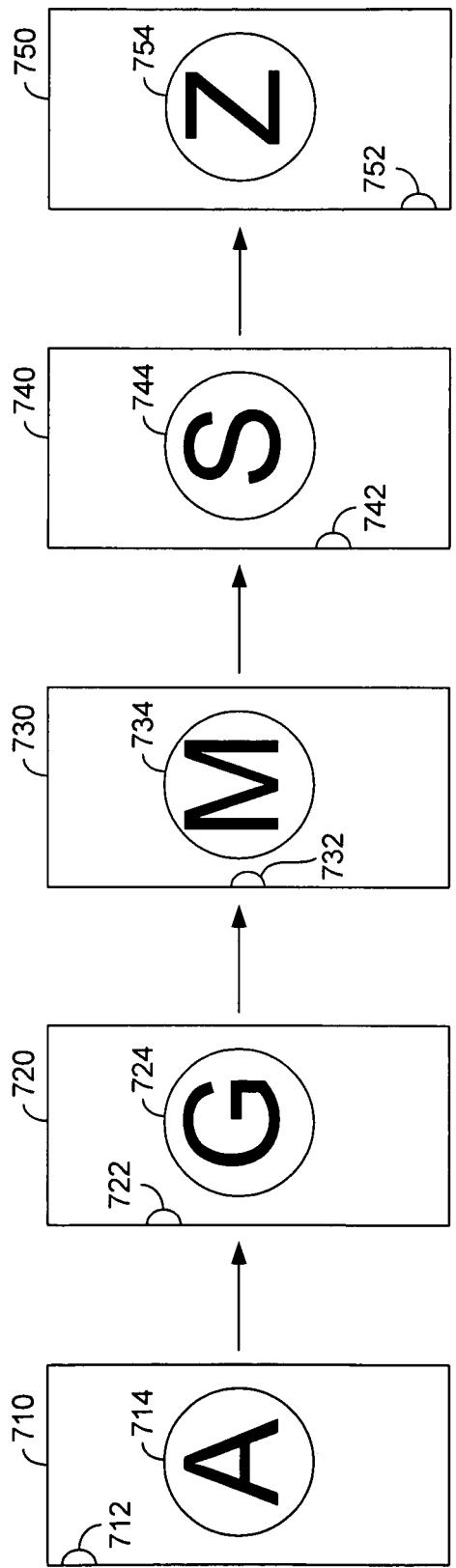
FIG. 7 depicts the dynamic nature of the positional indicator as the selectable option is moved in a first direction to reach a position among an ordered list of items, according to embodiments of the present invention.

Now referring to FIG. 7, we have provided an embodiment illustrating the ability of the positional indicator to display different information according to the corresponding position of the selectable option in relation to the location among the ordered list of items. Display 710 has a selectable option 712 and a positional indicator 714. In this aspect of the embodiment of FIG. 7, the ordered list of items may include contacts, sports teams, e-mail addresses, or any other list that may be ordered alphabetically. Selectable option 712 is located near the top of the device, and therefore corresponds to a position within the ordered list of items at the top or near the top of the list. If the list includes contacts saved to the mobile device, such as mobile communications device 210 in FIG. 2, the list may begin with one or more names that start with the letter "A," as is shown on positional indicator 714. The user may then select selectable option 712 by way of a touch action, which results from contact to display 710 with an object such as, for example, a finger, a stylus, or a fingernail.

Display 720 illustrates a second position of the selectable option 722 as a result of the user selecting and moving it in a first direction, for example, in a downward direction along the length of display 720, as shown. Moving selectable option 722 to a second position has caused positional indicator 724 to display a different letter corresponding to the new position of selectable option 722 in relation to the location among the ordered list of items. For instance, as the letter "G" is shown on positional indicator 724, one or more items within the ordered list may start with the letter "G." In this instance, if there are no items that start with the letter "G," "G" would not be presented on the positional indicator, and would skip to the next letter that is associated with the next item in the ordered list. In another instance, however, even if there are no items starting with "G," the letter "G" may still appear on the positional indicator.

In continued reference to FIG. 7, display 730 illustrates a third instance of the embodiment of FIG. 7, wherein selectable option 732 has been moved to a third position so that the letter presented on positional indicator 734 represents the item located among the ordered list of items corresponding to the position of selectable option 732 in this third position. Similarly, display 740 illustrates selectable option 742 in a fourth position, and the letter "S" on positional indicator 744 represents the corresponding item within the ordered list of items.

We have included display 750 to illustrate an instance where the selectable option 752 has been moved to the bottom or near the bottom of display 750, wherein its location corresponds to the last or one of the last items within the ordered list. Here, the letter "Z" is presented on positional indicator 754, indicating to the user that the end or near the end of the ordered list has been reached. The embodiment described above easily and efficiently allows a user to reach a desired item within an ordered list of items.

In the embodiments described above with respect to moving the selectable option, presenting the positional indicator, and reaching a desired location within an ordered list of items, it should be noted that while the ordered list of items may be visible on the display while the positional indicator is presented to the user, the ordered list of items may not change its position as the selectable option is moved on the display. In order to save processing power, the positional indicator dynamically displays the current position within the ordered list of items, but the ordered list of items remains in a constant position or state until the user reverses the touch action, for example, by removing the object (e.g., finger, fingernail, stylus) from the selectable option.

Figure 8A:
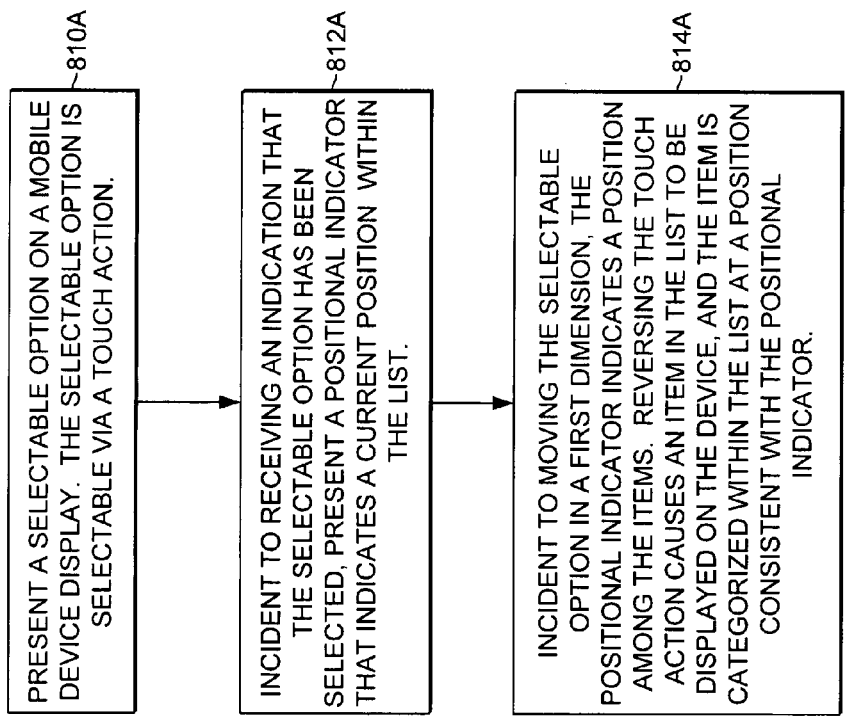
FIGS. 8A-8B depict illustrative methods of reaching a position in an ordered list of items, according to embodiments of the present invention.

To recapitulate, we have described an aspect of the invention that relates to performing a method of reaching a position in an ordered list of items on a display. With reference to FIG. 8A, one embodiment of this method includes, at a step 810A, presenting a selectable option on the mobile device's display that can be selected by touch actions. These touch actions might take the form of, for example, a user's finger, finger nail, or a stylus. At a step 812A, incident to receiving an indication that the selectable option has been selected, as described above, a positional indicator is presented on the display. The positional indicator indicates to the user its current position within the ordered list of items. For example, if the ordered list of items consists of names of soccer teams that are ordered alphabetically, the positional indicator may display a letter, as shown in FIG. 7, representing items in the ordered list located correspondingly to the position of the selectable option. At a step 814A, incident to the user moving the selectable option in a first dimension, the positional indicator indicates a position among the ordered list of items.

The user may, at any time, reverse the touch action by, for example, removing the object used to select the selectable option. For example, if the user used his or her finger to provide the touch action, the user may lift the finger from the display to reverse the touch action. Reversing the touch action causes an item in the ordered list to be presented on the display. In some embodiments, the item presented on the display is the first item in the ordered list that starts with the letter presented on the positional indicator when the touch action is reversed. For example, if the positional indicator displays an "M" at the time that the touch action is reversed, the first item starting with "M" may be the first item listed on the display.

In some embodiments of FIG. 8A, the length or width of the positional indicator is greater than a majority of a length or width of the display. We have illustrated this in FIG. 6, which illustrates that the positional indictor width 624 is greater than a majority of the display width 612 when the phone is positioned in a portrait view, as shown. Should the mobile device be turned on its side (e.g., landscape view), the positional indicator length, represented now by numeral 624, may be greater than a majority of the display length, now represented by numeral 612.

We previously mentioned that while the selectable option is being moved by the user, which causes the display of the positional indicator, the ordered list of items in the background may still be viewable. The ordered list, however, may become dimmed to focus the user's attention on the positional indicator, rather than on the ordered list. In an embodiment, the ordered list is gradually dimmed when the positional indicator is presented on the display, and may gradually revert to its original brightness once the touch action is reversed, as described above. In addition, in some embodiments, the presentation of the positional indicator may also be gradual, so that the positional indicator is first dimmed, and gradually becomes brighter on the display. The same would occur when the touch action is reversed, wherein the positional indicator may gradually disappear from the display.

Figure 8B:
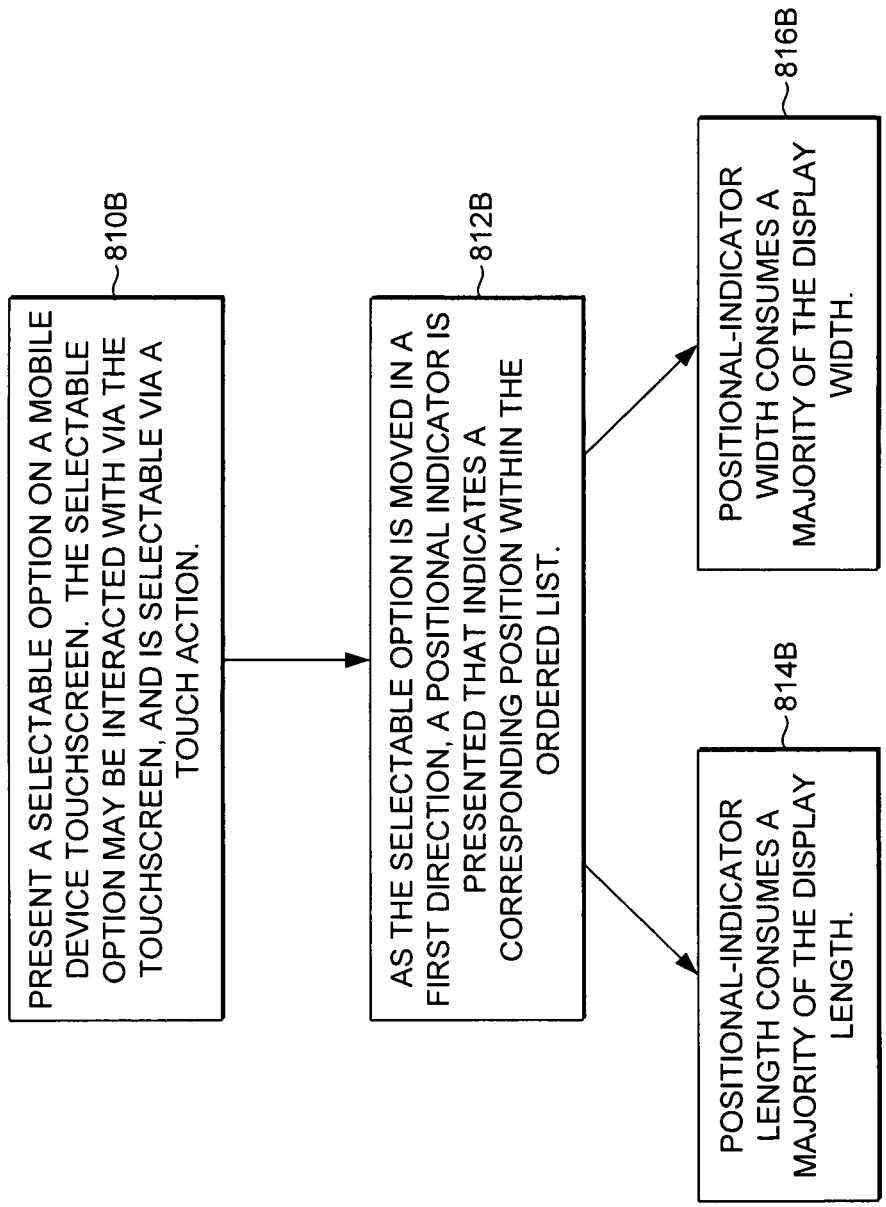

With reference to FIG. 8B, another embodiment of the invention is provided that includes presenting a selectable option on a touchscreen of a mobile device at a step 810B. The user may interact with the selectable option by way of the touchscreen, and in the same ways as described above, a touch action by the user allows the selectable option to be selected. At a step 812B, as the selectable option is moved in a first direction, a positional indicator is presented on the display that indicates to the user a corresponding position among the ordered list. The positional indicator's size is represented by a length and a width, such as a positional-indicator length and positional-indicator width. The display's size is also represented by a length and a width, termed a display length and a display width. As previously mentioned, the size of the positional indicator, in some embodiments, is such that either its length consumes a majority of the display length, or its width consumes a majority of the display width. This is represented by numerals 814B and 816B.

We have also mentioned that the user, upon locating an item using the selectable option and the positional indicator, may wish to locate an item in a subset list of items for the located item. One or more of the items in the ordered list may have an associated subset list of items, so that the positional indicator may be moved in a different direction, such as a second direction, to allow the user to navigate through the subset list of items and reach a desired location within this list as well. As with reversing the touch action described above, a user may cause an item within the subset list to be presented on the display by reversing the touch action (e.g., releasing the finger used to move the selectable option), wherein the item is categorized in the subset list at a position consistent with the positional indicator.

Event Disposition Control for Mobile Communications Device

Another aspect of an embodiment of the invention includes an ability to respond to various events by way of a mobile communications device. In one embodiment, a way to respond to a given event (such as receiving a call, receiving a voicemail, etc.) is to provide an informational element, which can take the form of a graphical user interface (GUI) object, that presents information related to the event and is also a slideable object that can be moved by a user into a drop zone to give rise to a desired action.

Figure 9A:
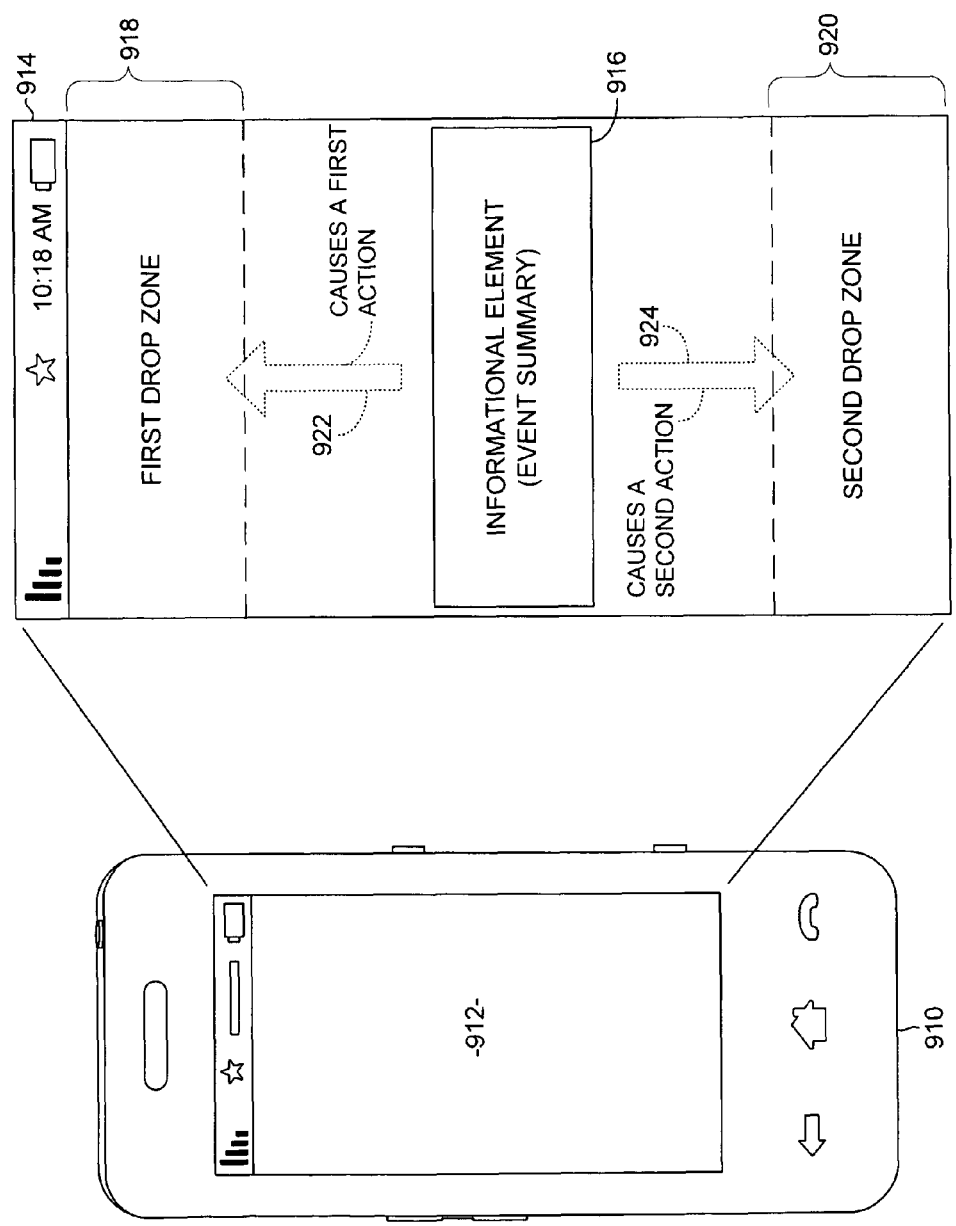
FIG. 9A depicts an embodiment of a slideable informational element according to an embodiment of the present invention.

Turning now to FIG. 9A, another representation of a mobile communications device is provided and referenced generally by the numeral 910. We use a separate reference numeral to help map the instant text to a relevant figure, but we do not mean to convey that mobile device 910 is different than any of the other many references to a mobile device throughout this disclosure, including the block-diagram representation of FIG. 1. Mobile device 910 includes a display 912, which in one embodiment is a touchscreen display that is able to receive input by way of touch actions or interactions.

Blown up for detail, a user interface 914 is shown as being presentable on display 912. Various types of events may give rise to seeking user input. Illustrative events include things such as receiving a phone call; receiving a message (e.g., a voicemail, an email, a text message, and the like); initiating an alarm; receiving a file (e.g., a picture, an audio file, a video file, and the like); or an arriving at a time associated with a calendared event. For example, ten o'clock on a Monday morning may arrive, which triggers a reminder to be presented.

In one embodiment, an informational element 916 is presented on display 912. Informational element 916 serves as an event summary that includes descriptive information that is contextually related to the event. Thus, for example, when mobile device 910 receives an incoming call, informational element 916 might present caller-identifying information that helps a user to determine an identification of the incoming caller. In the case of an alarm, informational element 916 might present textual data that describes the event associated with the alarm. We will describe this aspect in greater detail below. In some embodiments, our technology of utilizing sliding and drop zones helps prevent unintentional actions, such as accidentally unlocking the mobile device.

As mentioned, incident to an occurrence of some event, informational element 916 is presented on display 912. This affords the option to a user to move informational element 916 to one of at least two drop zones, including a first drop zone 918 and a second drop zone 920. Upward movement is indicated by dotted arrow 922, and downward movement is indicated by dotted arrow 924. Informational element 916 both presents information describing or related to the event that gave rise to its presentation and is also slideable by way of touch actions into either of the first or second drop zones 918, 920.

Although we say "into" the drop zones, we do not mean to imply that informational element 916 needs to be moved to wholly within a drop zone. This is not the case. In fact, in some embodiments, mobile device 910 tracks an amount of movement away from an initial starting position. If informational element 916 is moved beyond a threshold distance away from the initial starting position in a certain direction, then it will be deemed to have been dropped in one of the two drop zones. Similarly, if information element 916 is moved beyond a threshold distance toward another drop zone, then it will be deemed to have been released into the other drop zone. In still other embodiments, informational element 916 will be deemed to have been dropped into one of the drop zones if it is moved within a certain proximity of that drop zone. Thus, it might be the case that if an upper portion of informational element 916 crosses some threshold area associated with first drop zone 918, then it will be considered to have been moved to the first drop zone. Same with the second drop zone.

In some embodiments, a user may use his or her finger or a stylus or some other object to indicate a desire to move informational element 916. One way that motion of informational element 916 might be tracked is for mobile device 910 to map a general pressure point to a specific point or line. This specific point or line can then be used to track how far informational element 916 is moved along display 912.

Each of the drop zones 918 and 920 are associated with certain actions. That is, if informational element 916 is moved to first drop zone 918 then a first action occurs, and if informational element 916 is dragged to second drop zone 920, then a second action occurs. In one embodiment, if informational element 916 is not dragged to either first drop zone 918 or to second drop zone 920, then a default action is allowed to occur. This default action is different than either the first or second actions. Being different, though, does not necessarily contemplate an entirely different action, but also includes a temporal differentiation. For example, if a user of device 910 receives an incoming call, the device might ring for a certain period of time, after which the notification will stop. But this only occurs after a certain amount of time; for example, six rings or 25 seconds (random examples). It may be the case that the second action, associated with second drop zone 920 is to dismiss a call which, in effect, stops the incoming-call notification. Although it may be true that in both situations the incoming-call notifications were stopped, the second action is still different than the default action because the default action would have allowed the call-notification operations to continue for a certain amount of time, but the second action (which is associated with second drop zone 920) stopped the call-notification operations immediately.

Figure 9B:
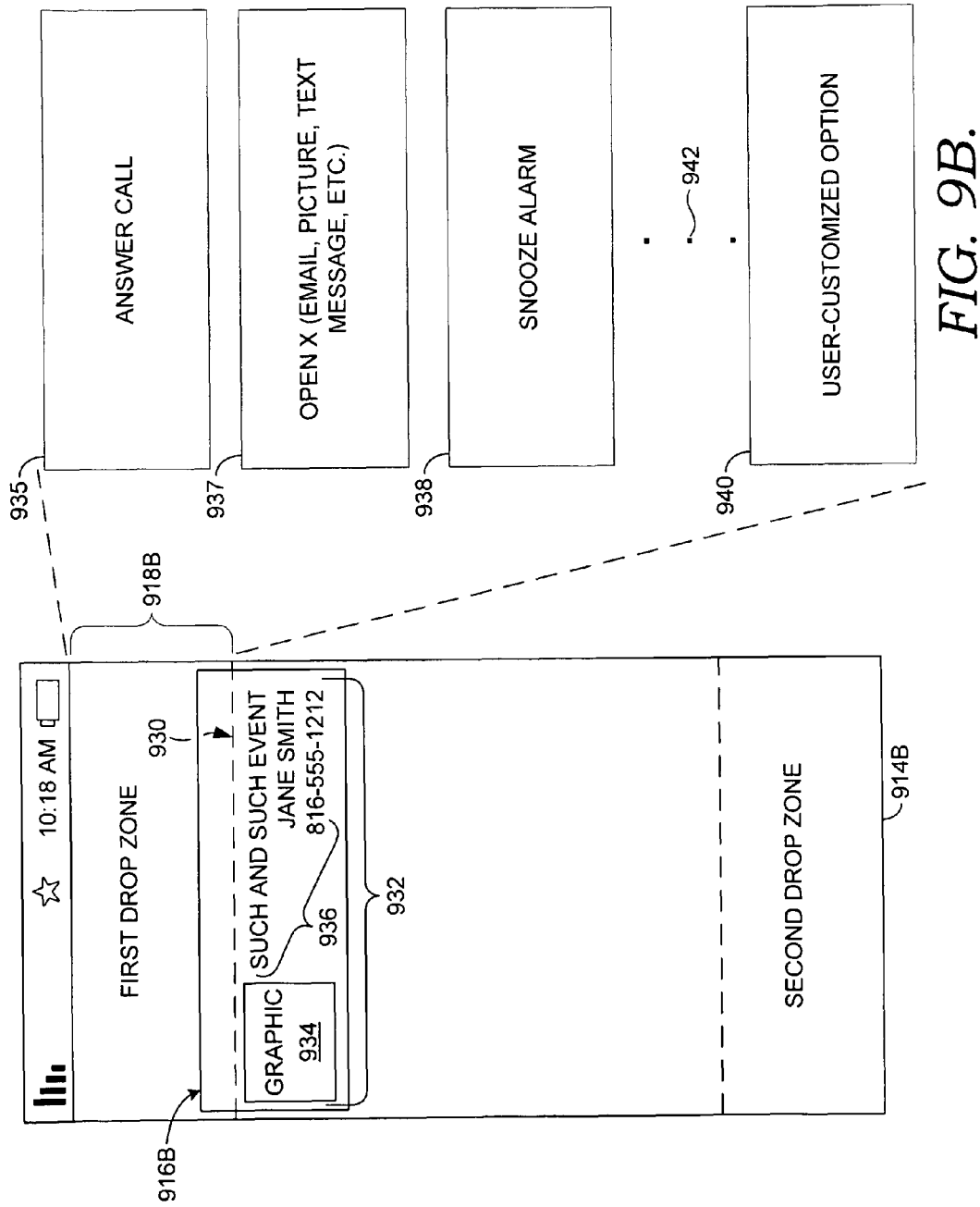
FIGS. 9B and 9C depict illustrative actions that can be associated with different drop zones according to embodiments of the present invention.

Turning now to FIG. 9B, additional detail is provided to help describe the notion of a certain action happening incident to moving informational element 916 to a certain drop zone. Like reference numerals correspond to like objects, but we will add a "B" designator to help refer to specific items in specific FIGs. Thus in FIG. 9B, user interface 914B depicts an informational element 916B, and a first drop zone 918B. In one embodiment, first drop zone 918B consumes an upper portion of the display. Although not necessarily shown on user interface 914B, first drop zone 918B might begin at a reference line, which is denoted by numeral 930. Again, a user may not see line 930. In other embodiments, first drop zone 918B might be clearly presented on user interface 914B for the user to see so that the user will know of a boundary that defines first drop zone 918B. As shown, descriptive information 932 is included as part of informational element 916B. This information may include one or both of a graphic 934 as well as textual information 936. Other types of descriptive information could also be provided in informational element 916B. We show two for illustrative purposes.

As mentioned, descriptive information 932 is related to the incoming event that gave rise to the presentation of informational element 916. For example, if the relevant event were an incoming call, then graphic 934 might present a picture of the incoming caller. Textual information 936 might present identifying indicia that identifies the incoming caller. If the incoming event were an alarm, then graphic 934 might take the form of a stagnant bell or some other indicator that a user might readily associate with an alarm. Graphic 934 can also be customized by a user so that the user can determine what gets presented incident to an occurrence of some event.

The type of descriptive information that gets presented varies with the nature of the instant event. We show some illustrative events in FIG. 9B; for example answer a call is designated by reference numeral 935. Reference numeral 937 references opening "X," which symbolizes anything that might be opened; for example, an email message, a picture, a text message, etc. Numeral 938 indicates snoozing an alarm. Reference numeral 940 represents a user-customized option. Thus, in one embodiment, the first drop zone 918B becomes associated with a user-defined option such that when informational element 916B is moved to first drop zone 918B, an action that has been selected by a user is performed. Clearly, other actions can also be performed besides those that are illustratively shown. We indicate this by ellipses 942.

As we have discussed so far, an incoming event might give right to a presentation of informational element 916B. In such a situation, a user has an option of moving informational element 916B to one of at least two drop zones, which will trigger a certain action to be performed. We have shown some illustrative actions such as answering a call, opening attachments, or snoozing an alarm. If a user desires to carry out what might be opposites of the types of actions listed in FIG. 9B, then the informational element can be moved to the second drop zone.

Figure 9C:
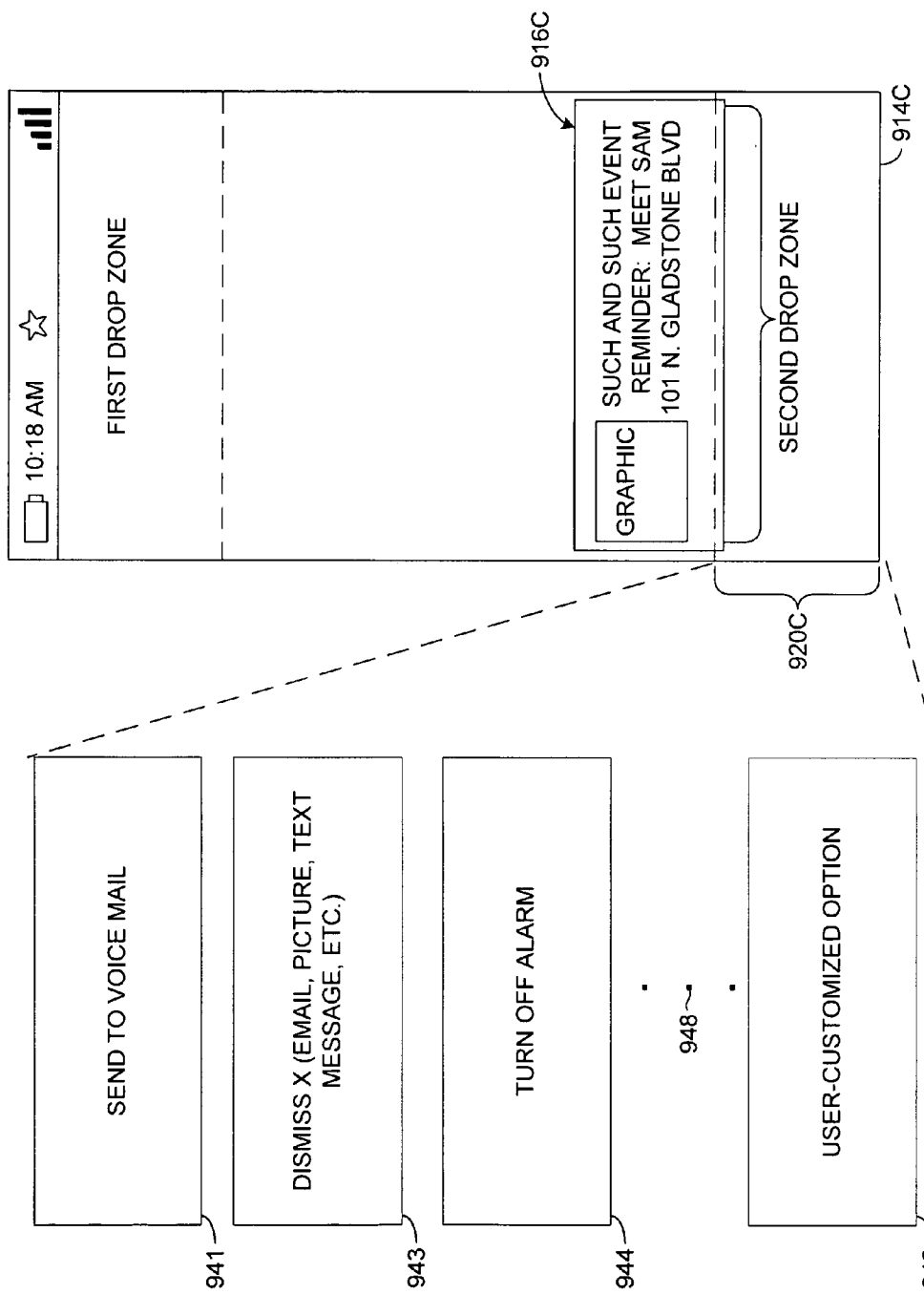

Turning to FIG. 9C, user interface 914C is shown as including second drop zone 920C, which might receive informational element 916C. If informational element 916C is moved to second drop zone 920C, then a different set of actions might occur than those that occurred as we mentioned in connection with FIG. 9B. For example, rather than answering a call, a second action might be to send that call to voicemail, referenced by numeral 941. Rather than opening an attachment or a message, etc., the same might be dismissed, which is indicated by reference numeral 943. Rather than responding to an alarm or snoozing an alarm, dragging informational element 916C to second drop zone 920C might turn off an alarm, which is referenced by numeral 944. A user can customize a desired option, which includes providing a new option, that should be carried out when informational element 916C is moved to second drop zone 914C. This is referenced by numeral 946. Of course other actions might be performed in connection with dragging informational element 916C to second drop zone 914C, which is represented by ellipses 948.

One way that this aspect of the invention is helpful is that a sliding motion is hard to accidentally cause, especially sliding to a specific area. Thus, if mobile device 910 is in a user's pocket or handbag and a certain event occurs, then by utilizing embodiments of the present invention, unintended actions can be avoided. That is, a user is unlikely to accidentally complete a sequence necessary to give rise to an action, especially when that sequence includes initially tapping in a certain portion of display 912 so as to activate or direct a focus to informational element 916, and then to also drag informational element 916 to one of the two drop zones 918 or 920.

Figure 9D:
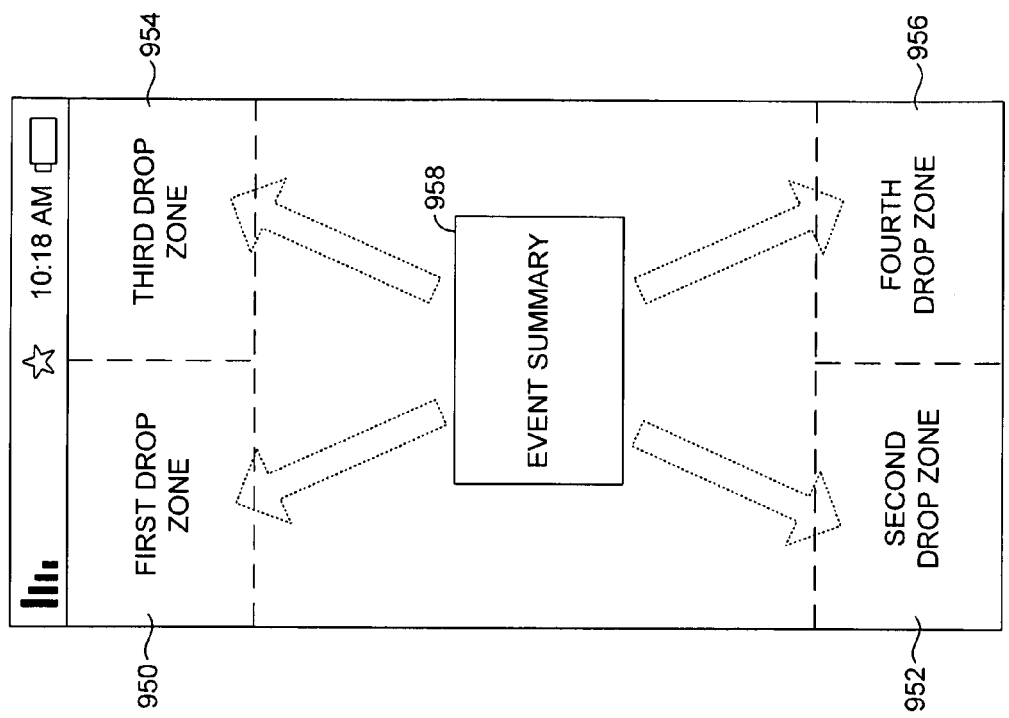
FIG. 9D depicts more than two drop zones according to an embodiment of the present invention.

In some embodiments, more than two drop zones can be provided. For example, and with reference to FIG. 9D, we illustratively show four drop zones: first drop zone 950, second drop zone 952, third drop zone 954, and fourth drop zone 956. In this embodiment, event summary 958 can be moved to any of four drop zones to initiate one of four possible actions. In this way, more alternatives can be provided to a user to respond to an incoming event. For example, consider a situation when a person receives a picture mail, or an email with a picture attachment. Perhaps first drop zone 950 opens the textual portion of the email message. Whereas dragging the picture mail to third drop zone 954 may open only the picture portion of the message. Dragging the event summary associated with the picture mail to second drop zone 952 might be associated with a dismissal action to dismiss any sort of a notification associated with the arrival of the picture mail message. And fourth drop zone 956 might be associated with moving the picture mail message to a user-defined folder so that a user can easily locate the message in the future.

FIG. 10 depicts a representation of a product known as the iPhone offered by Apple Inc. of Cupertino, Calif. One feature included in the iPhone is the ability to slide a control to answer an incoming call. Thus, with reference to FIG. 10, a phone 1010 includes a slideable element 1012, which is designated by shading. The slideable element includes an edge 1014. Often, an outline is provided, which includes an edge 1016. Embodiments of our invention are different than this sort of technology, which has no secondary action, uses a very small portion of the screen, utilizes only a single direction, does not encompass the concept of a drop zone, has no dismiss action, and a variety of other differences. In the prior-art example, slideable control 1012 must be dragged completely to the right to answer an incoming call. That is, edge 1014 must come in contact with edge 1016. Accordingly, the concept of a drop zone is not employed. Moreover, slideable element 1012 is just that, merely an element that does not provide any descriptive information. That is, the thing that is moved is static in the respect that whenever a phone call comes in, it is merely presented, but does not include any sort of descriptive information that is associated with the event that gave rise to its presentation. That is, there is nothing contextually relevant that describes the event that gave rise to its presentation. A user would not be able to achieve a desired action by using the prior art without looking at the device. But according to embodiments of our invention, a user could easily approximate a halfway portion of a screen and easily drag our informational element into one of the two drop zones without even looking at the device. We will also describe below ways to vary a vibrational response of the mobile device consistent with a dragging of the informational element. Still further differences include the fact that only a single action can be performed. But according to embodiments of our invention, multiple actions can be performed including what we refer to as both a positive action as well as a negative action, which are to the exclusion of a default action. Thus, when an incoming call is received on our described device, it can either be answered or affirmatively sent to voicemail or some other action taken. The prior art offers no secondary action, especially in which the secondary action is not some default action.

Figure 11A:
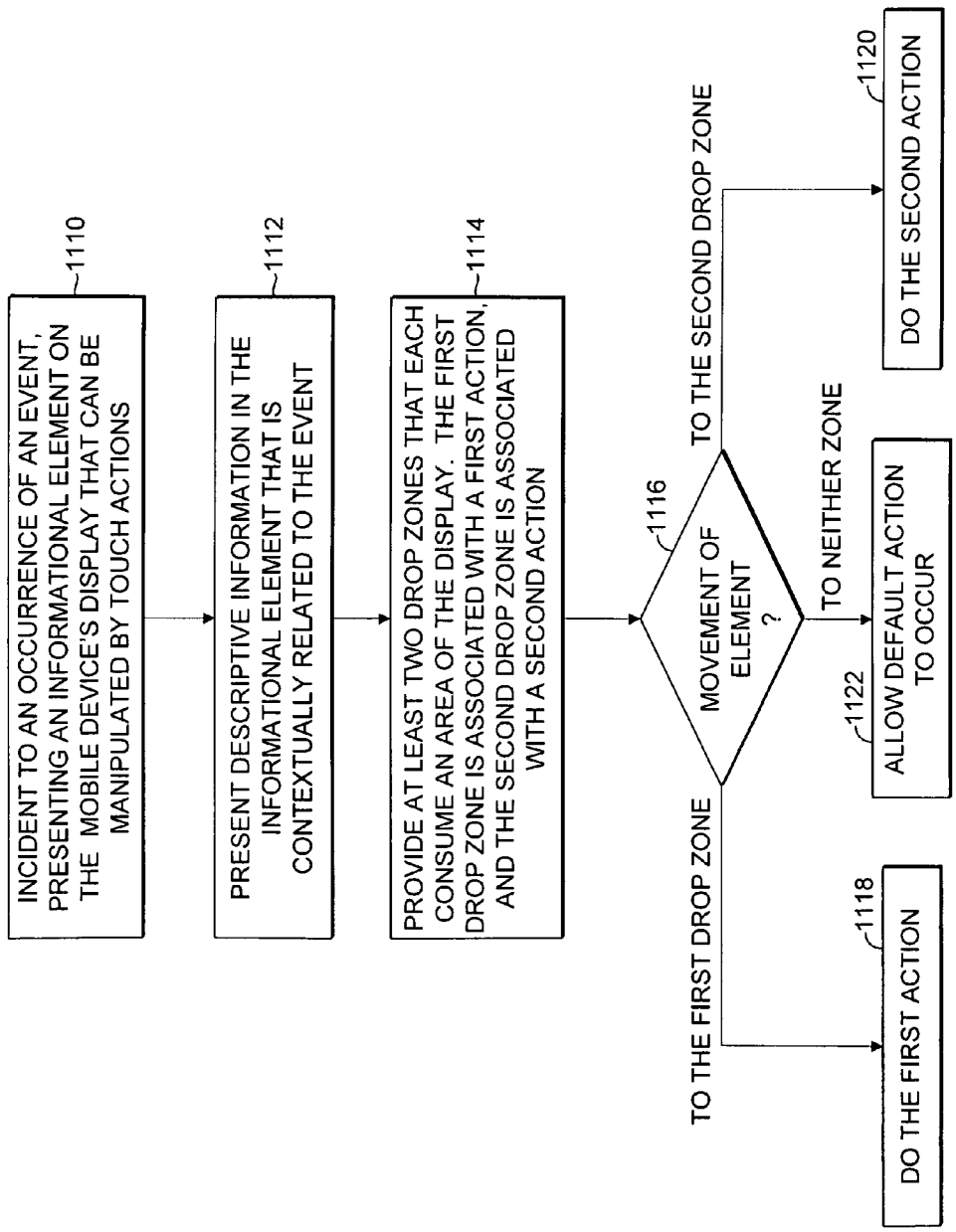
FIGS. 11A-11B depict illustrative methods of responding to events according to embodiments of the present invention.

To recapitulate, we have described an aspect of the invention that relates to performing a method of responding to an event by way of a mobile communications device. With reference to FIG. 11A, one embodiment of this method includes, at a step 1110, incident to an occurrence of an event, presenting an informational element on the mobile device's display that can be manipulated by touch actions. These touch actions might take the form of a user's finger touch actions or also might include a user using a stylus. At a step 1112, descriptive information is presented in the informational element that is contextually related to the event. Thus, descriptive information can include things such as a caller's phone number, a picture associated with a caller, or a file name of a file. At a step 1114, at least two drop zones are provided that each consume an area of the display. The first drop zone is associated with the first action, and the second drop zone is associated with a second action. In one embodiment, the first drop zone is in an upper portion of the display, and a second drop zone is in a lower portion of the display, or vice versa. We explained that the first action is not always the same. That is, the action associated with the first drop zone varies according to the nature of the event that gave rise to the presentation of informational element 916 to begin with. In some cases moving informational element 916 to first drop zone 918 causes a first action to occur, but, depending on the nature of the event, dragging informational element 916 to the exact same drop zone causes a different action or set of actions to occur. Thus, the first action differs according to the event that gave rise to the presentation of informational element 916. In some embodiments, first drop zone 918 is associated with a positive-type action, whereas second drop zone 920 is associated with a negative-type action.

Decision diamond 1116 indicates different actions that might occur as the informational element 916 is moved in various ways. As mentioned, if the informational element is moved to the first drop zone then mobile device 910 will do the first action, as indicated by numeral 1118. If the informational element is moved to the second drop zone, then mobile device 910 will do the second action, as indicated by numeral 1120. If the informational element is not dragged to either drop zones, then a default action will be allowed to occur, which is referenced by numeral 1122. We have mentioned that this default action is different at least in some respects than either of the first or second actions, including a difference that may be defined in a temporal aspect.

Illustrative positive actions include answering an incoming call, observing an incoming message, viewing an incoming file, viewing an incoming media attachment, opening a calendar-related item, and the like. Illustrative negative-type actions include dismissing an incoming call, sending an incoming call to voicemail, dismissing an incoming message, dismissing an incoming call, silencing an alarm, or the like. What some people refer to as positive actions, other people may refer to as negative actions.

Figure 11B:
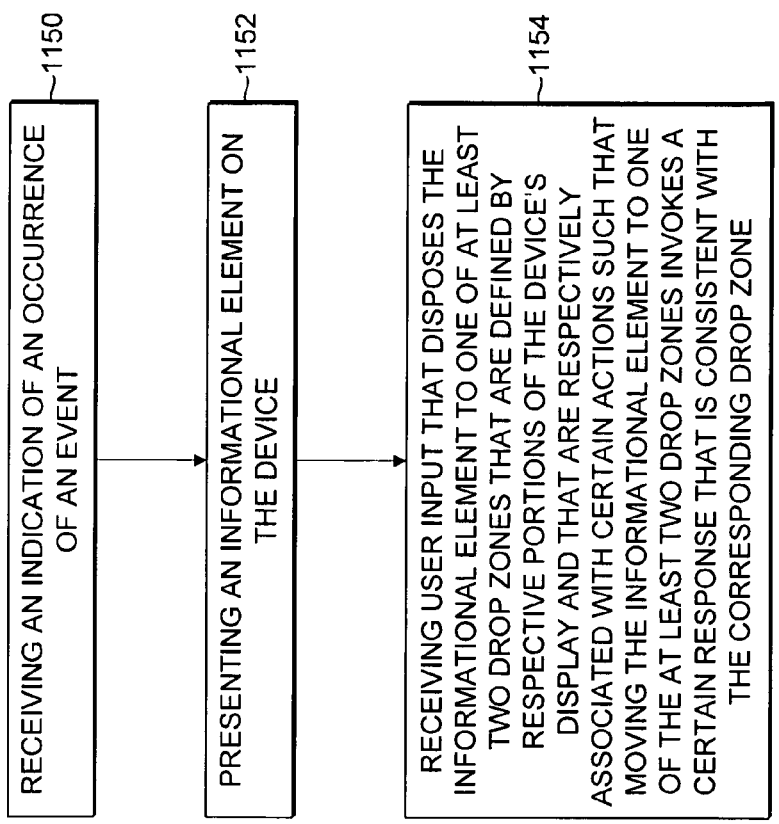

With reference to FIG. 11B, another embodiment of the invention is provided that includes receiving an indication of an occurrence of an event at a step 1150. At a step 1152, the embodiment of this method continues by presenting an informational element on the device. We have discussed possible natures of the informational element and how it includes information that is contextually relevant to the nature of the event that gave rise to the presentation of the informational element.

A final illustrative step 1154 includes receiving user input that disposes the informational element to one of at least two drop zones that are defined by respective portions of the device's display and that are respectively associated with certain actions such that moving the informational element to one of the at least two drop zones invokes a certain response that is consistent with the corresponding drop zone. We have also mentioned how the response can vary based on either the nature of the event or based on how the user has customized what actions should flow incident to the informational element being moved to a respective drop zone.

Physical Feedback to Indicate Object Directional Slide

As previously alluded to, another aspect of the invention includes an ability to enhance vibrational feedback so that it can provide information on tasks that are being performed. An illustrative task is a drag task. In this aspect of the invention, directional slide can be indicated by vibrational response.

Figure 12:
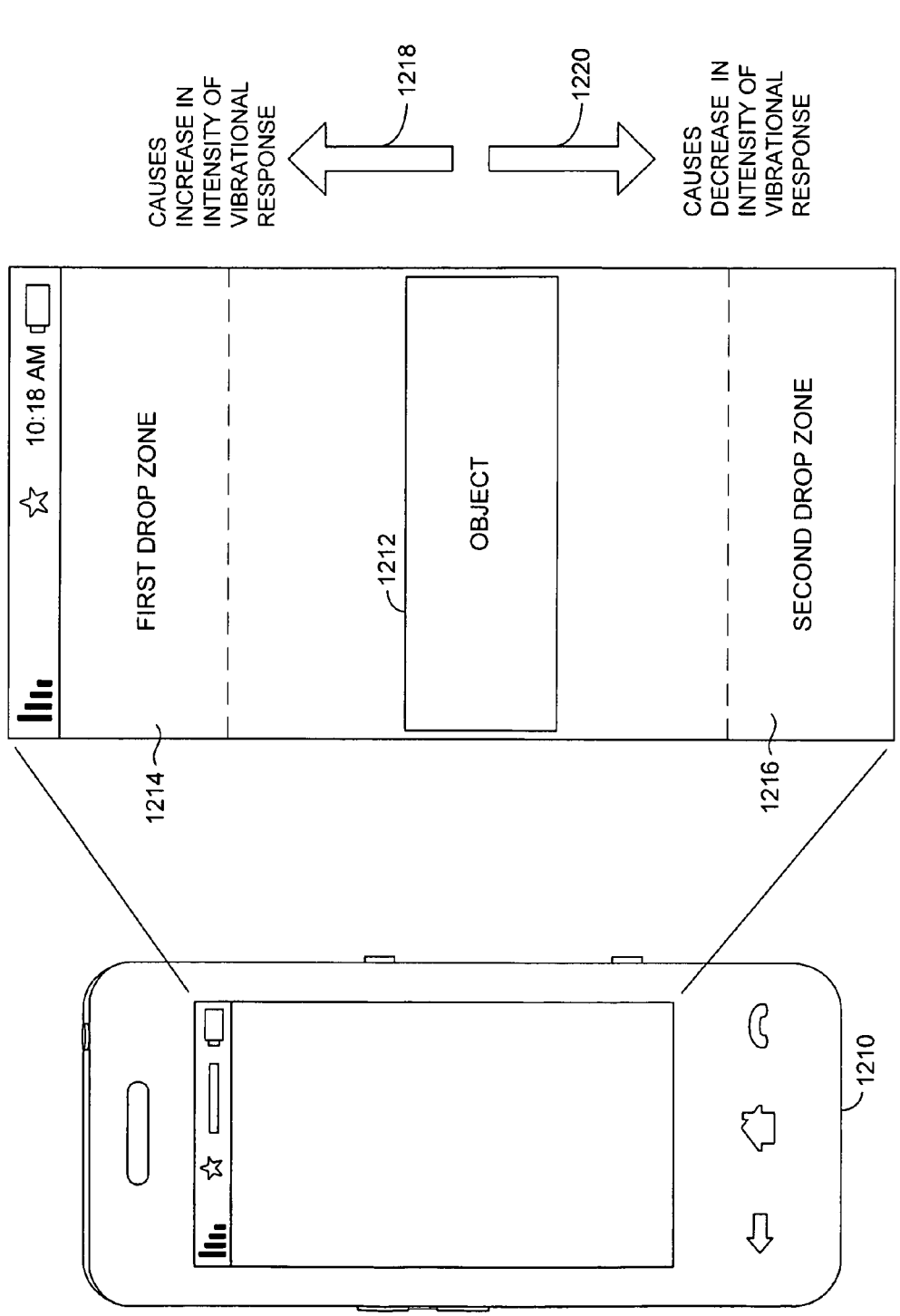
FIG. 12 depicts an object whose directionality can be determined based on a vibrational response according to an embodiment of the present invention.

Consider FIG. 12. As we previously discussed, an object 1212 can be presented on device 1210 incident to an occurrence of some event. We previously described how this object can be dragged into one of at least two drop zones 1214 and 1216 to cause one of at least two desired actions to occur. We explained that dragging object 1212 into first drop zone 1214 could cause a first action to occur that is associated with first drop zone 1214, and we also described how dragging object 1212 to second drop zone 1216 could be used to instantiate a different action that is associated with second drop zone 1216.

There may be some cases where it is desirable for a user to be able to determine a direction that object 1212 is being moved without looking at the display of mobile device 1210. Moreover, there may be cases where a user has limited visual acuity, or may even be blind, such that viewing the display of mobile device 1210 is not even possible. Rather than making such a device as mobile communications device 1210 unavailable to such users, we provide a way to indicate directional movement by providing vibrational feedback.

For example, in one embodiment, as object 1212 is moved upward 1218, an intensity of a vibrational response increases. Similarly, as object 1212 is moved in a downward direction 1220, an intensity of a vibrational response of device 1210 decreases. As previously alluded to, "intensity" can include magnitude and/or frequency.

As previously mentioned, this object 1212 can include descriptive information that describes attributes of the event that gave rise to its presentation.

The vibrational response that is provided incident to moving object 1212 is dynamic in nature and occurs in real time. That is, it is dynamic in nature in that it can continuously vary as the location of object 1212 varies. It is continuous in that whatever response is being provided continues to be provided until a desired outcome is reached. Thus, rhythmic or pulsing responses are contemplated within the scope of "continuous."

In some embodiments, the vibrational response continues until a desired task is completed. For example, to complete a task might be to drop object 1212 into one of the two drop zones 1214 or 1216. In some embodiments, the intensity of the vibrational response continues along some pattern as object 1212 is moved along a first direction. In some embodiments, the vibrational response changes drastically once 1212 is moved to drop zone 1214. In some embodiments, changing drastically means to cease a vibrational response. In other embodiments, changing drastically means providing a vibrational response that is inconsistent with the pattern that had been followed as object 1212 was being moved along a first direction.

As mentioned, moving object 1212 in an upwardly direction might cause an increase in intensity of vibrational response. An increase in intensity can include an increase in magnitude and/or an increase in frequency. An increase in magnitude would mean that a small vibrational response would turn into a larger vibrational response. For example, a gentle ping might turn into a more robust thud. Another way that intensity can be increased is by increasing frequency. Mobile device 1210 might buzz more the more object 1212 is moved in an upward direction. The frequency by which vibrations are measured can increase as object 1212 is moved in a first direction.

Everything we say can be applicable to movement in the second direction but with an opposite effect. That is, moving object 1212 in a downward direction 1220 might cause a decrease in intensity of a vibrational response. That is, a frequency decrease might occur, or a magnitude decrease might occur.

Figure 12A:
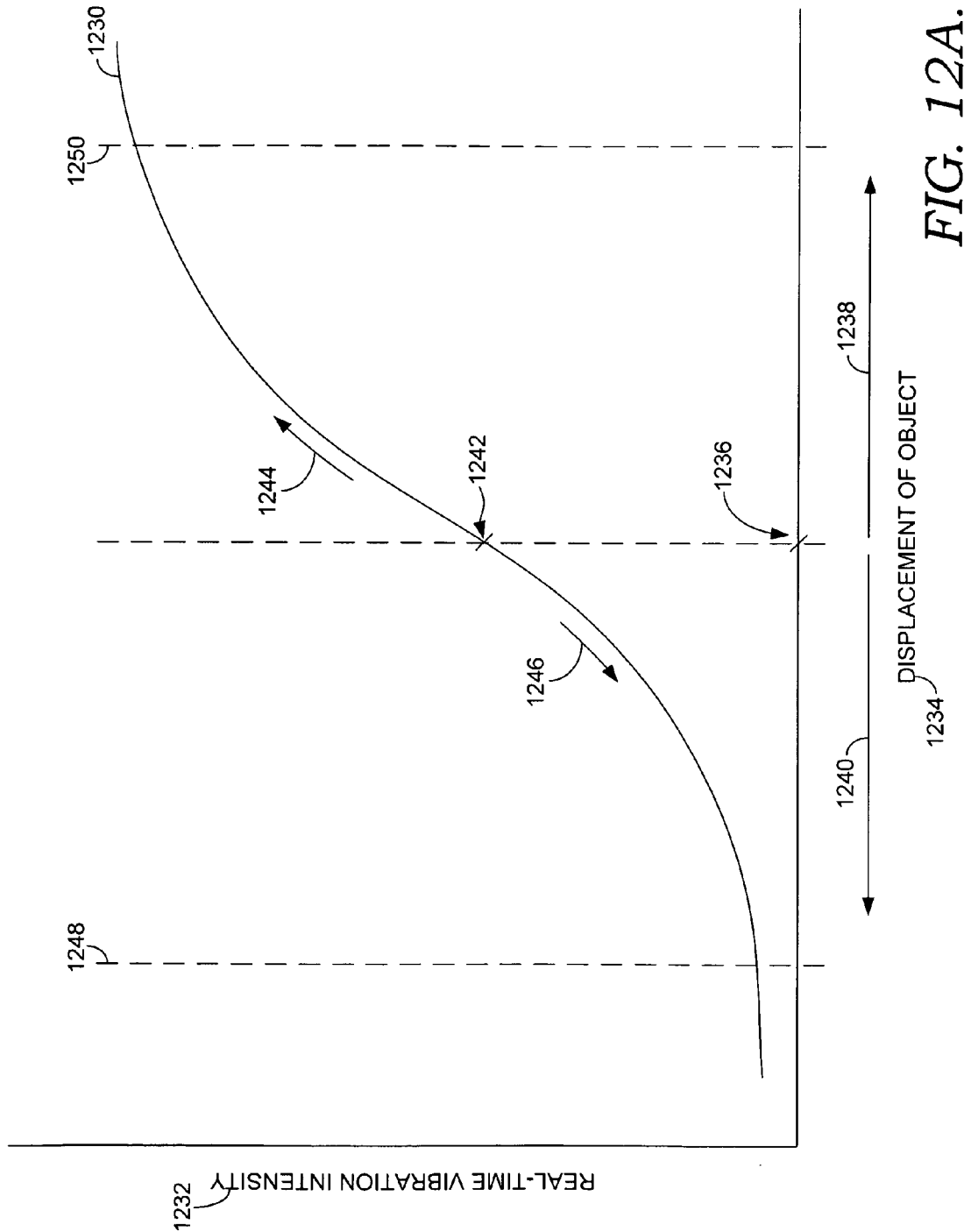
FIGS. 12A-12B depict an illustrative mapping of vibrational intensity (which can include varying frequency and/or magnitude) to displacement of an object according to embodiments of the present invention.

Turning now to FIG. 12A, a curve 1230 is depicted as part of a diagram that plots an illustrative vibrational intensity 1232 based on a displacement 1234 of a GUI object from some starting position 1236. In one embodiment, rightward flow 1238 would translate to displacing an object in a first direction, whereas leftward flow 1240 would indicate movement in a second direction.

Reference numeral 1242 marks an illustrative starting location. Thus, say an incoming call was received by mobile device 1210. In this example, object 1212 would be presented, and mobile device 1210 would vibrate with an intensity consistent with a level denoted by reference numeral 1242. As object 1212 is moved toward first drop zone 1214, the vibrational intensity might increase consistent with the upper portion 1244 of curve 1230. As object 1212 is moved in a different direction, vibrational intensity might decrease consistent with a lower portion 1246 of curve 1230.

In one embodiment, curve 1230 is monotonically increasing. That is, each instance of intensity is greater than the previous when moving in a rightward direction. It may be the case that curve 1230 is monotonically increasing only over a certain range of values. For example, perhaps curve 1230 is only monotonically increasing from the area marked by a first dashed line 1248 as well as a second dashed line 1250. It may be the case that beyond this range, curve 1230, although not shown in this way, may take on a drastically different pattern than in the past. For example, for displacements beyond marker 1250, perhaps the vibrational intensity drops markedly off, which would translate to a steep decline in curve 1230 after marker 1250. It might also be the case that the vibrational intensity markedly increases after marker 1250.

Figure 12B:
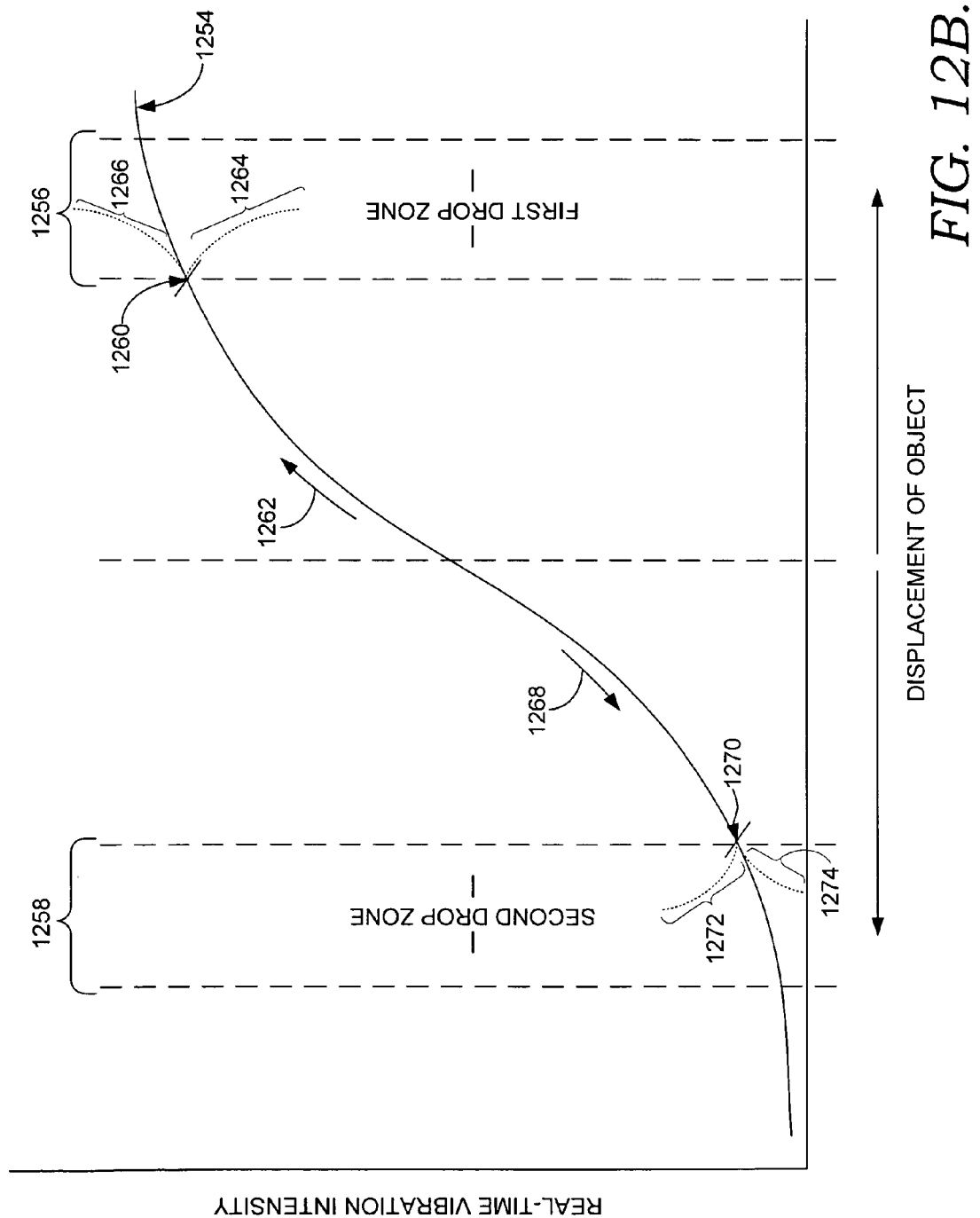

One way that such marked changes might be used can be seen in connection with FIG. 12B, which depicts another curve, which is referenced by numeral 1254. On FIG. 12B, we illustrate two drop zones, such as a first drop zone 1256 and a second drop zone 1258. As we have previously mentioned, it may be the case that a vibrational intensity makes a marked change after a certain displacement from a starting position. One possible point to mark such a change in vibrational intensity is referenced by numeral 1260. As shown, a vibrational intensity of mobile device 1210 might progressively increase along an upper portion 1262 of curve 1254 until point 1260 is reached, at which a vibrational intensity might change in a way that is different than it had been changing as object 1212 was being moved in a first direction. Again, although not necessarily reflected in diagram 12B, it may be the case that after object 1212 is moved beyond point 1260, and into drop zone 1256, curve 1254 follows a path such as that referenced by numeral 1264 or that marked by numeral 1266. One reason for doing this is to allow a user to be able to perceive that object 1212 has been moved to a specific drop zone.

Similarly, moving object 1212 along a lower portion 1268 of curve 1254 might continue along a certain pattern until a point 1270 is reached, after which it may make a marked change, which is intended to be shown by reference numerals 1272 as well as numeral 1274.

Figure 12D:
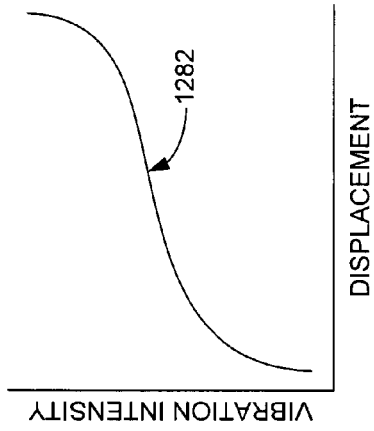
FIGS. 12C-12F depict illustrative curve diagrams that might describe patterns of vibrational intensity as displacement of an object varies according to embodiments of the present invention.
Figure 12F:
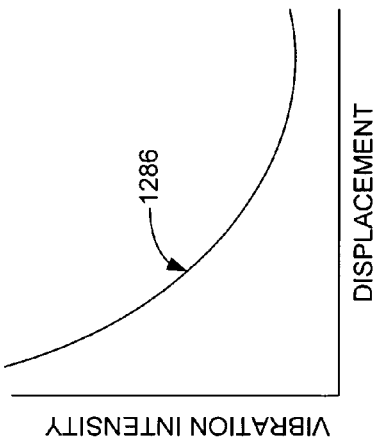
Figure 12C:
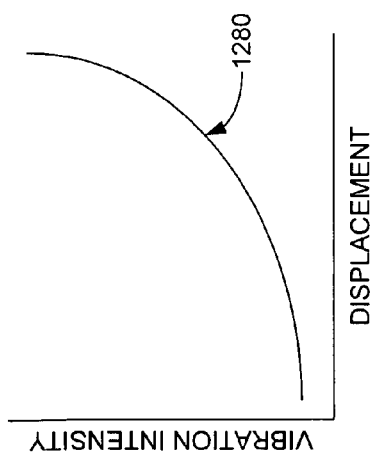
Figure 12E:
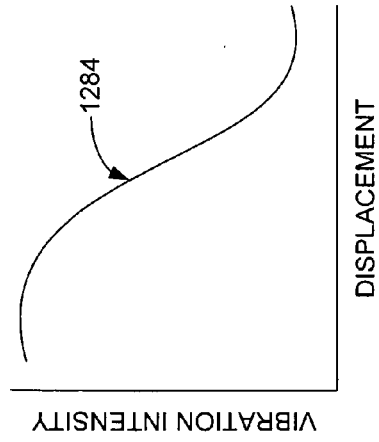

The general shape of curve 1254 does not need to follow the shape that is shown in FIG. 12A or 12B. Rather, as is desired, curve 1254 may take on a variety of shapes. With reference to FIGS. 12C through 12D, we indicate that vibrational intensity may increase in a manner consistent with curve 1280 of FIG. 12C. Curve 1282 of FIG. 12D is another possible pattern. Vibrational intensity may also follow the curve of 1284 of FIG. 12E as object 1212 is displaced in different directions. Still another illustrative curve is indicated by reference numeral 1286 of FIG. 12C. We do not mean for reference numerals 1280-1286 to be all inclusive; but rather, they are intended to illustrate that various patterns are applicable to various embodiments of the present invention.

Figure 13A:
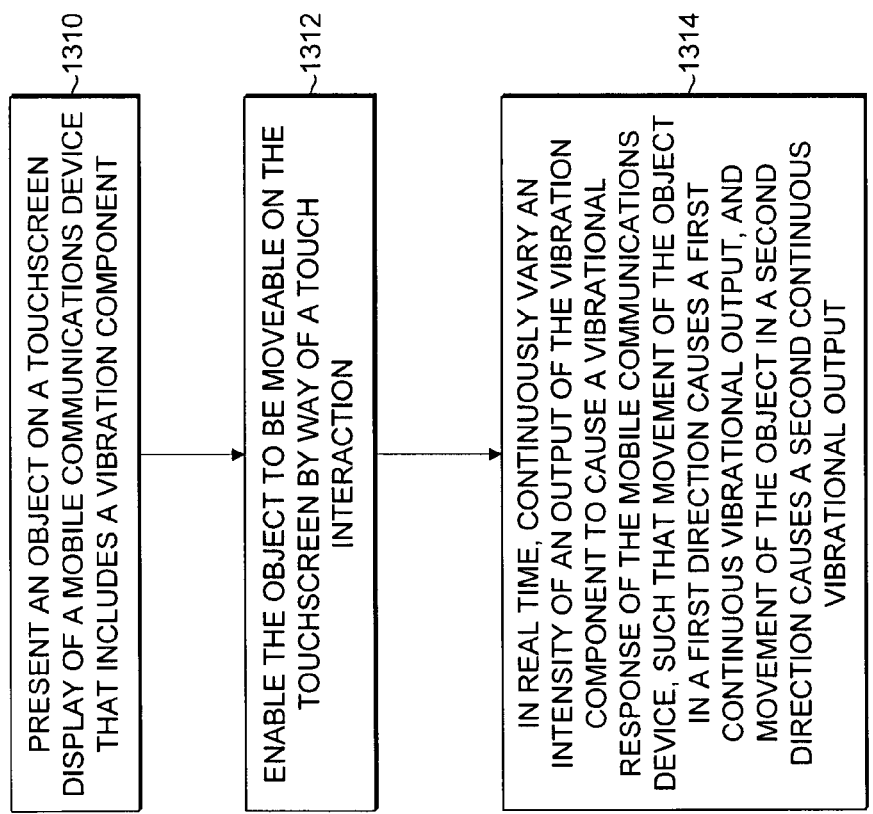
FIGS. 13A-13B depict flow diagrams of illustrative methods of utilizing real-time control of a vibration component to provide informational feedback of a movement of an object along a display of a mobile communications device according to embodiments of the present invention.

FIG. 13A depicts a flow chart that illustrates an illustrative method for enabling a user to control a mobile communications device that includes a vibration component. At a step 1310, an object is presented on a touchscreen display of a mobile communications device that includes a vibration component. An illustrative vibration component can be the vibration component 124 referenced in FIG. 1. In some embodiments, vibration component 124 takes the form of a motor with an offset weight such that rotating the offset weight causes the motor, or a thing coupled to the motor, to vibrate. In some embodiments, vibration component 124 takes the form of a haptics motor. Real-time control is used to support directionality.

At a step 1312, the object is made moveable on the touchscreen such that it can be moved by way of a touch interaction. Thus, for example, a user can use his or her thumb to move object 1212. As the user moves object 1212 in different directions, different vibrational responses are provided dynamically and in real time so that a user can perceive a direction that object 1212 is being moved by perceiving the vibrational response. Thus, at a step 1314, in real time, an intensity of an output of the vibration component is continuously varied to cause a vibrational response of the mobile communications device such that movement of the object in a first direction causes a first continuous vibrational output, and movement of the object in a second direction causes a second continuous vibrational output. We have mentioned that in one embodiment, the intensity can monotonically increase as object 1212 is progressively more displaced along a first direction such that every advancement of the object in the first direction produces a vibrational output that is greater than when the object was in any proceeding position. In some embodiments, this occurs up until a certain threshold, after which the vibrational intensity changes in an inconsistent way so as to denote that an object such as object 1212 has moved into a certain area of interest such as a drop zone. Of course embodiments of the present invention do not need to rely on dual drop zones as we have shown. Rather, the scope of this aspect of the invention is widely applicable to any graphical user interface object that is to be moved in some direction. Directionality of that object can be made to correspond to a vibrational intensity such that directionality of the object can be perceived by perceiving the intensity of the corresponding vibrational output. In some embodiments, processor 116 is configured to help coordinate the vibrational response to a movement of an object such as object 1212 so that movement of the object can be deciphered without (or with) physically viewing display 118. This vibrational response would not be a mere playback of a prerecorded action; but rather, a dynamically created vibrational response that is created based on a movement of the object. Thus, more than just playing back a response incident to an occurrence of some event, embodiments of the invention provide for a real-time creation of a vibrational response that occurs based on real-time events. In some embodiments, vibrational outputs follow respectively consistent patterns; namely, for some ranges they progressively increase or progressively decrease.

Figure 13B:
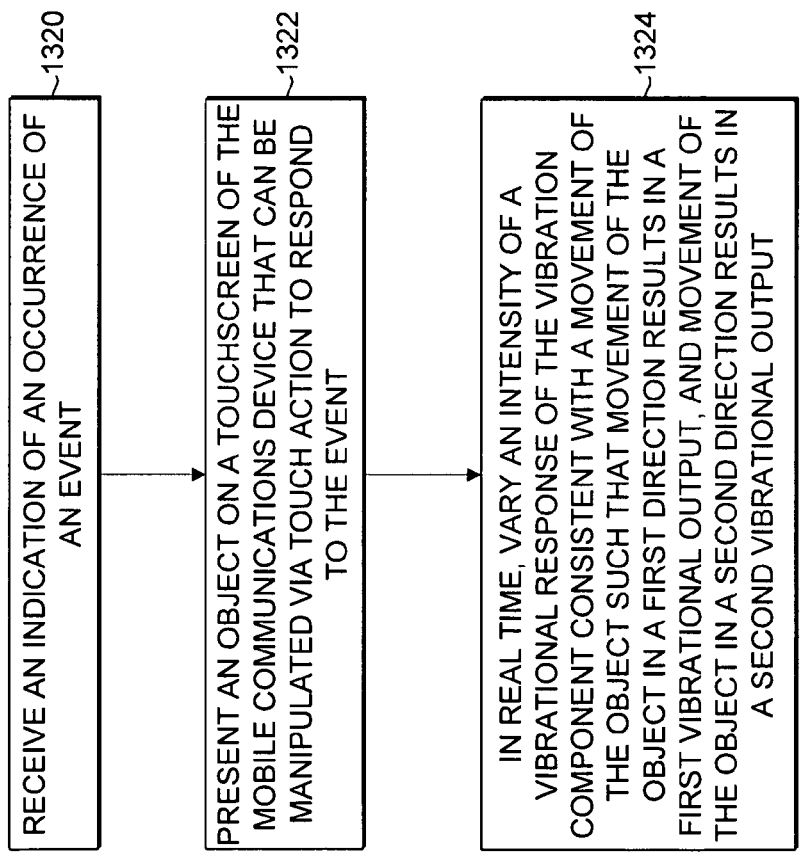

Turning now to FIG. 13B, another embodiment of the present invention is provided. At a step 1320, an indication of an occurrence of an event is received. At a step 1322, an object is presented on a touchscreen of the mobile device. The object can be manipulated via touch action to respond to the event.

At a step 1324, in real time, an intensity of a vibrational response is varied consistent with a movement of the object such that the movement of the object in a first direction results in a first vibrational output, and movement of the object in a second direction results in a second vibrational output.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method of inputting data into a mobile communications device having a touchscreen, the method comprising:

receiving a user-entered character string; displaying the user-entered character string at a first position on the touchscreen, wherein a cursor is displayed at a second position on the touchscreen indicating where a next entered character will be displayed, wherein the second position is different than the first position;

automatically replacing the user-entered character string with a suggested character string, thereby providing a replacement character string displayed at the first position on the touchscreen;

marking the replacement character string displayed at the first position on the touchscreen with a visual indication that the replacement character string replaced the user-entered character string;

maintaining the visual indication that the replacement character string has automatically replaced the user-entered character string even when the suggested character string is a correctly spelled word, wherein the visual indication is maintained when a second replacement character string is marked with a second visual indication that the second replacement character string has automatically replaced a second user-entered character string;

providing an input region associated with the visual indication that can receive touch input, wherein the input region is defined by a portion of the touchscreen that surrounds the replacement character string that is marked with the visual indication, and wherein the input region is separate from the cursor; and incident to receiving touch input by way of the input region, presenting a set of alternative character strings as suggestions for replacing the replacement character string, wherein receiving touch input by way of the input region does not change a position of the cursor.

2. The media of claim 1 wherein the user-entered character string is a misspelled word.

3. The media of claim 1 wherein the user-entered character string is a correctly spelled word.

4. The media of claim 1, wherein the suggested character string is a correctly spelled word that has at least one character in common with the first character string.

5. The media of claim 4, wherein the user-entered character string is not recognized by the mobile touchscreen device.

6. The media of claim 1, wherein marking the replacement character string with a visual indication comprises underlining at least a portion of the replacement character string.

7. The media of claim 1, wherein marking the replacement character string with a visual indication comprises displaying at least a portion of the replacement character string in a color that is different than a color used to display a character string that has not been replaced.

8. The media of claim 1, wherein the input region comprises an area on the touchscreen in which the replacement character string is displayed.

9. The media of claim 1, wherein the set of alternative character strings comprises one or more character strings each having at least one character in common with the user-entered character string, and wherein one of the two or more character strings is the user-entered character string.

10. The media of claim 9, further comprising providing an input region corresponding to each of the two or more character strings.

11. The media of claim 10, further comprising replacing the replacement character string with one of the one or more character strings incident to receiving touch input by way of the input region associated with the one of the one or more character strings.

12. One or more non-transitory computer-readable media having computer-useable instructions embodied thereon for performing a method of inputting data into a mobile communications device having a touchscreen, the method comprising:

presenting an option to a user that permits the user to select an active or inactive state associated with an automatic-correction function that automatically replaces a user-entered character string with a suggested character string, wherein the suggested character string is determined regardless of whether the automatic-correction function is set to the active or the inactive state;

receiving a user selection comprising one of an active or inactive state associated with the automatic-correction function, wherein the automatic-correction function is set to an active or an inactive state, respectively;

receiving a user-entered character string;

referencing a dictionary database that comprises a plurality of recognized character strings;

automatically determining a suggested character string regardless of whether the automatic-correction function is set to the active or the inactive state, wherein the suggested character string comprises one of the plurality of recognized character strings suggested as a replacement for the user-entered character string;

determining whether the automatic-correction function is set to the active or the inactive state;

when the automatic-correction function is set to the inactive state, then:
(A) preserving the user-entered character string as entered by the user, and
(B) marking the user-entered character string with a visual indication that indicates the suggested character string has been determined; and when the automatic-correction function is set to the active state, then:
(A) automatically replacing the user-entered character string with the suggested character string,
(B) marking the suggested character string with a visual indication that the suggested character string replaced the user-entered character string, and
(C) maintaining the visual indication that the suggested character string replaced the user-entered character string, until touch input is received that corresponds to an instruction to remove the visual indication.

13. The media of claim 12, wherein the dictionary database comprises one or more databases each comprising a plurality of recognized character strings.

14. The media of claim 13, wherein referencing the dictionary database comprises querying at least one of the one or more databases to identify a suggested character string that has one or more characters in common with the user-entered character string.

15. The media of claim 12, further comprising providing an input region corresponding to the visual indication that can receive touch input, wherein incident to receiving touch input by way of the input region, a set of alternative character strings as suggestions for replacing the suggested character string is provided.

16. The media of claim 15, further comprising presenting an option to the user that permits the user to select an inactive state associated with the automatic-correction function, wherein the option is presented incident to receiving touch input by way of the input region.

17. One or more non-transitory computer-readable media having computer-useable instructions embodied thereon for performing a method of inputting data into a mobile communications device having a touchscreen, the method comprising:

receiving a user-entered character string that is displayed at a location on the touchscreen;

referencing a dictionary database that comprises a plurality of recognized character strings;

automatically replacing the user-entered character string on the touchscreen with a first suggested character string, wherein the first suggested character string is one of the plurality of recognized character strings, and wherein the first suggested character string becomes a replacement string at the location on the touchscreen;

marking the replacement character string with a visual indication that the replacement character string replaced the user-entered character string, the visual indication comprising an input region that can receive touch input;

incident to receiving touch input by way of the input region, presenting an option for removing the first suggested character string from the dictionary database;

incident to receiving touch input representing a user selection of the option for removing the first suggested character string from the dictionary database,
  (A) removing the first suggested character string from the dictionary database, and
  (B) when the first suggested character string is removed from the dictionary database, then replacing the replacement character string at the location on the touchscreen with the user-entered character string that was originally entered or with a second suggested character string; and maintaining the visual indication after removing the suggested character string from the dictionary database.

18. The media of claim 17, further comprising presenting an option for adding the user-entered character string to the dictionary database, wherein the option is presented incident to receiving touch input by way of the input region.

* * * * *